United States Patent
Suzuki

(10) Patent No.: US 7,834,681 B2
(45) Date of Patent: Nov. 16, 2010

(54) SEMICONDUCTOR INTEGRATED CIRCUIT

(75) Inventor: Atsushi Suzuki, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/556,937

(22) Filed: Sep. 10, 2009

(65) Prior Publication Data

US 2010/0127764 A1    May 27, 2010

(30) Foreign Application Priority Data

Nov. 21, 2008    (JP)  .............................. 2008-297619

(51) Int. Cl.
     *G05F 1/10*      (2006.01)
     *G05F 3/02*      (2006.01)
(52) U.S. Cl. ...................... 327/536; 327/539
(58) Field of Classification Search ................ 327/536, 327/539; 363/59–60
See application file for complete search history.

(56) References Cited

U.S. PATENT DOCUMENTS

| | | | |
|---|---|---|---|
| 5,644,534 A * | 7/1997 | Soejima ................. | 365/185.23 |
| 6,255,896 B1 * | 7/2001 | Li et al. ....................... | 327/536 |
| 6,373,327 B1 * | 4/2002 | Nakamura ................... | 327/536 |
| 6,414,881 B1 * | 7/2002 | Fujii et al. ............. | 365/189.09 |
| 7,595,682 B2 * | 9/2009 | Lin et al. ..................... | 327/536 |

FOREIGN PATENT DOCUMENTS

| | | |
|---|---|---|
| JP | 11-045125 | 2/1999 |
| JP | 2002-036197 | 2/2002 |

* cited by examiner

*Primary Examiner*—Quan Tra
(74) *Attorney, Agent, or Firm*—Turocy & Watson, LLP

(57) ABSTRACT

A semiconductor integrated circuit comprises a first transistor which has one end connected to a first node where a first voltage is output, and which transfers the first voltage to an output terminal, a second transistor which has one end connected to a second node where the second voltage is output, and which transfers the second voltage to the output terminal, a third booster circuit which supplies a third voltage obtained by further boosting the first voltage to a control terminal of the first transistor, and a fourth booster circuit which supplies a fourth voltage obtained by further boosting the second voltage to a control terminal of the second transistor. The third booster circuit lowers a voltage supplied to the control terminal of the first transistor to turn off the first transistor at a time after discharging of the first node is started. The fourth booster circuit increases, in accordance with a signal from the third booster circuit, a voltage supplied to the control terminal of the second transistor to turn on the second transistor after the first transistor is turned off.

20 Claims, 13 Drawing Sheets

[LOCAL PUMP CIRCUIT 25B]

[VOLTAGE FOLLOWER CIRCUIT 28]

SEMICONDUCTOR INTEGRATED CIRCUIT

CROSS-REFERENCE TO RELATED APPLICATION

This application is based upon and claims the benefit of priority, from the prior Japanese Patent Application No. 2008-297619, filed on Nov. 21, 2008, the entire contents of which are incorporated herein by reference.

BACKGROUND OF THE INVENTION

1. Field of the Invention

The present invention relates to a semiconductor integrated circuit, and more specifically, a semiconductor integrated circuit for controlling a variable capacitance capacitor using Micro Electro Mechanical Systems (MEMS) (hereinafter, "MEMS-type variable capacitance capacitor").

2. Description of the Related Art

MEMS-type variable capacitance capacitors have capacitor electrodes formed at relatively-movable portions of an MEMS configuration, and cause such movable portions to deform to physically change a distance between those two electrodes, thereby changing the capacitance therebetween (see, for example, JP2002-36197A).

In addition to the capacitor electrodes (main electrodes), for example, drive electrodes for deformation and capacitance change are also provided. As a voltage (deformation voltage Vact) is applied between such drive electrodes, a distance between the capacitor electrodes is reduced by Coulomb force, thus increasing the electrostatic capacitance of the capacitor. Conversely, as the voltage application between the drive electrodes is terminated, elastic force which restores the deformed movable portions acts, so that the capacitor electrodes return to the original positions, thus reducing the electrostatic capacitance of the capacitor to the original value.

When it is required to keep the electrostatic capacitance of the capacitor constant after the distance between the electrodes is reduced, it is necessary to keep applying a constant voltage (hold voltage Vhold) between the drive electrodes to maintain the distance of the capacitor electrodes constant. The hold voltage (Vhold) is lower than the deformation voltage (Vact) needed to reduce the distance between the electrodes.

In order to reduce the amount of charges trapped in an insulator sandwiched between the drive electrodes (to avoid a condition so-called "stiction"), to improve the reliability of the MEMS-type variable capacitance capacitors, and to reduce power consumption, the hold voltage Vhold is set as low as possible. Moreover, to return the distance between the electrodes to the original distance, the voltage between the drive electrodes is set back to 0 V.

According to such electrostatic actuators, a condition is changed over from a condition in which the deformation voltage Vact that is a high voltage is supplied to a condition in which the hold voltage Vhold that is lower than the deformation voltage is supplied. In this case, however, a large voltage is applied to a switching transistor used for such changeover, resulting in deterioration of the reliability due to aging.

SUMMARY OF THE INVENTION

A semiconductor integrated circuit according to a first aspect of the present invention comprises: a first booster circuit configured to boost a power supply voltage to a first voltage; a second booster circuit configured to boost a power supply voltage to a second voltage; a first transistor having one end connected to a first node where the first voltage is output, the first transistor being configured to transfer the first voltage to an output terminal; a second transistor having one end connected to a second node where the second voltage is output, the second transistor being configured to transfer the second voltage to the output terminal; a third booster circuit configured to supply a third voltage obtained by further boosting the first voltage to a control terminal of the first transistor to turn on the first transistor; a fourth booster circuit configured to supply a fourth voltage obtained by further boosting the second voltage to a control terminal of the second transistor to turn on the second transistor; a first discharging circuit configured to discharge a voltage at the first node to a predetermined voltage; and a second discharging circuit configured to discharge a voltage at the output terminal to a predetermined voltage, and the third booster circuit being further configured to lower a voltage supplied to the control terminal of the first transistor to turn off the first transistor at a time after discharging of the first node is started, and the fourth booster circuit being further configured to increase, in accordance with a signal from the third booster circuit, a voltage supplied to the control terminal of the second transistor to turn on the second transistor after the first transistor is turned off.

Moreover, a semiconductor integrated circuit according to a second aspect of the present invention comprises: a first booster circuit configured to boost a power supply voltage to a first voltage; a second booster circuit configured to boost a power supply voltage to a second voltage; a first transistor having one end connected to a first node where the first voltage is output, the first transistor being configured to transfer the first voltage to an output terminal; a second transistor having one end connected to a second node where the second voltage is output, the second transistor being configured to transfer the second voltage to the output terminal; a third booster circuit configured to supply a third voltage obtained by further boosting the first voltage to a control terminal of the first transistor to turn on the first transistor; a fourth booster circuit configured to supply a fourth voltage obtained by further boosting the second voltage to a control terminal of the second transistor to turn on the second transistor; a first discharging circuit configured to discharge a voltage at the first node to a predetermined voltage; a second discharging circuit configured to discharge a voltage at the output terminal to a predetermined voltage; a limiter circuit configured to output a limiter signal based on a comparison result between a voltage corresponding to a voltage at the first node and a reference voltage, the limiter signal being for terminating an operation of the first booster circuit; and a reference voltage generating circuit configured to generate the reference voltage, and the reference voltage generating circuit comprising: a first current path including a first pMOS transistor, a first resistor, and a first diode connected in series in this order between a third node and a ground potential; a second current path including a second pMOS transistor, a second resistor, a third resistor, and N number of parallel-connected diodes connected in series in this order between the third node and a ground potential; a third current path including a third pMOS transistor and a first variable resistor connected in series between the third node and a ground potential; a fourth pMOS transistor connected between the third node and a power supply voltage source; and a first differential amplifier having a first input terminal connected to respective gates of the first, second, and third pMOS transistors, and a second input terminal connected to a connection between the first pMOS transistor and the first resistor, the first differential amplifier being configured to output a differential signal to a gate of the fourth pMOS transistor, and the first variable resistor being configured to have a resistance changed from a first value to a second value lower than the first value at a time after a voltage at the first node reaches the first voltage.

Further, a semiconductor integrated circuit according to a third aspect of the present invention comprises: a first booster circuit configured to boost a power supply voltage to a first voltage; a second booster circuit configured to boost a power supply voltage to a second voltage; a first transistor having one end connected to a first node where the first voltage is output, the first transistor being configured to transfer the first voltage to an output terminal; a second transistor having one end connected to a second node where the second voltage is output, the second transistor being configured to transfer the second voltage to the output terminal; a third booster circuit configured to supply a third voltage obtained by further boosting the first voltage to a control terminal of the first transistor to turn on the first transistor; a fourth booster circuit configured to supply a fourth voltage obtained by further boosting the second voltage to a control terminal of the second transistor to turn on the second transistor; a first discharging circuit configured to discharge a voltage at the first node to a predetermined voltage; a second discharging circuit configured to discharge a voltage at the output terminal to a predetermined voltage; a limiter circuit configured to output a limiter signal based on a comparison result between a voltage corresponding to a voltage at the first node and a reference voltage, the limiter signal being for terminating an operation of the first booster circuit; and a reference voltage generating circuit configured to generate the reference voltage, and the reference voltage generating circuit comprising: a first current path including a first pMOS transistor, a first resistor, and a first diode connected in series in this order between a third node and a ground potential; a second current path including a second pMOS transistor, a second resistor, a third resistor, and N number of parallel-connected diodes connected in series in this order between the third node and a ground potential; a third current path including a third pMOS transistor and a first variable resistor connected in series between the third node and a ground potential, and by a fourth pMOS transistor connected between a fourth node and a drain of the third pMOS transistor; a fourth current path including a fifth pMOS transistor and a second variable resistor connected in series between the third node and a ground potential, as well as a sixth pMOS transistor connected between the fourth node and a drain of the fifth pMOS transistor; a fifth current path including a seventh pMOS transistor connected between the third node and a fifth node, by an eighth pMOS transistor connected between the fourth node and the fifth node, and by a first nMOS transistor connected with the fourth resistor in a diode connection manner between the fifth node and a ground potential, the seventh pMOS transistor, the eighth pMOS transistor, and the first nMOS transistor being connected in this order; a sixth current path including a ninth pMOS transistor and a fifth resistor connected in series in this order between the fourth node and a ground potential; a tenth pMOS transistor connected between the third node and a power supply voltage source; a first differential amplifier having a first input terminal connected to respective gates of the first, second, third, fifth, and seventh pMOS transistors, and a second input terminal connected to a sixth node which is a connection between the first pMOS transistor and the first resistor, the first differential amplifier being configured to output a differential signal to a gate of the tenth pMOS transistor; and a second differential amplifier having a first input terminal connected to the sixth node, and a second input terminal connected to a seventh node which is a connection between the ninth pMOS transistor and the fifth resistor, the second differential amplifier being configured to output a differential signal to respective gates of the fourth, fifth, eighth, and ninth pMOS transistors, and the first variable resistor being configured to have a resistance changed from a first value to a second value lower than the first value at a time after a voltage at the first node reaches the first voltage.

DETAILED DESCRIPTION OF THE EMBODIMENTS

An explanation will be given of embodiments of the present invention with reference to accompanying drawings.

First Embodiment

Figure 1:
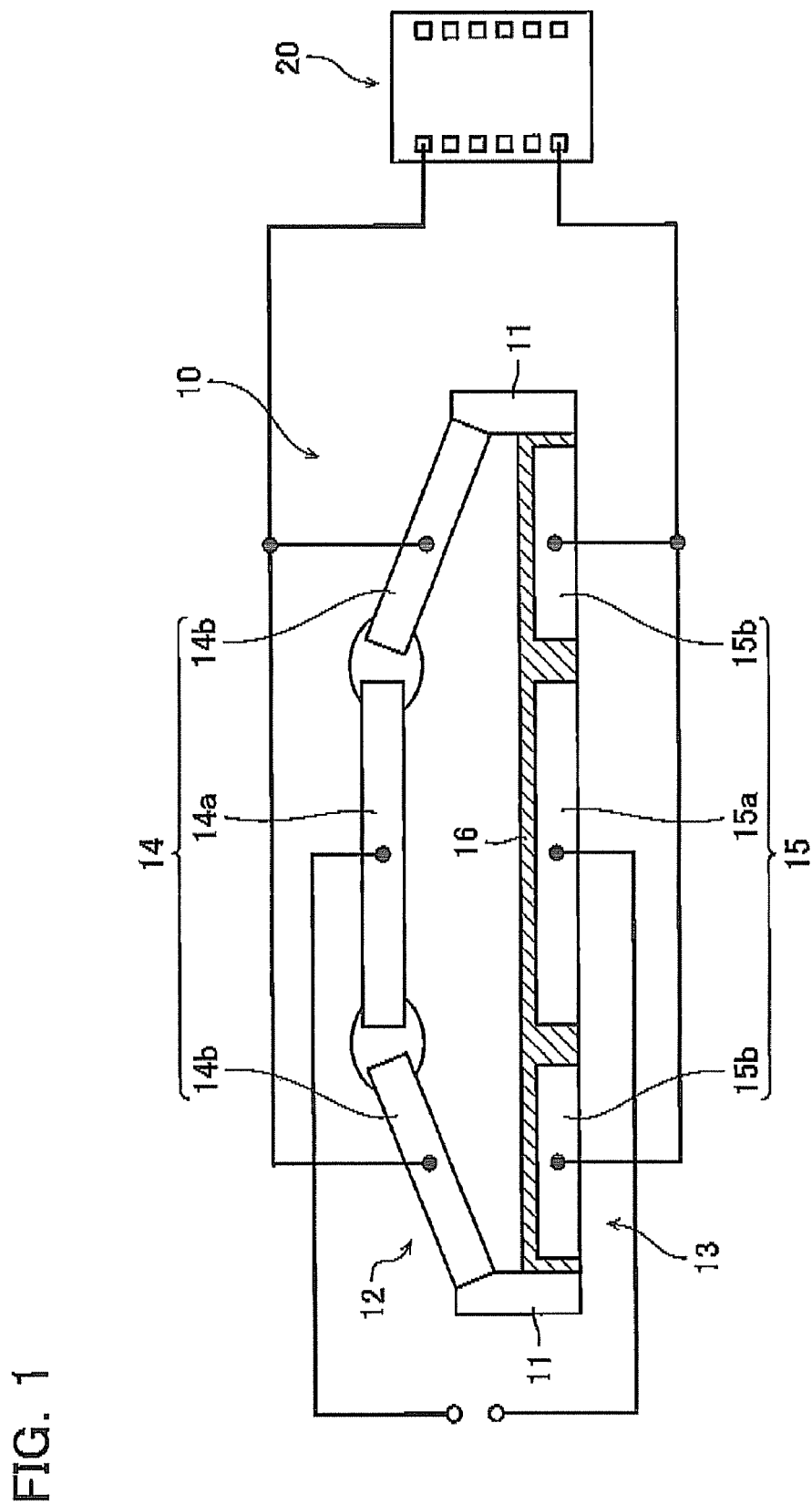
FIG. 1 is a schematic diagram showing a configuration of a semiconductor integrated circuit according to a first embodiment of the present invention.

First, a semiconductor integrated circuit according to the first embodiment of the present invention will be explained with reference to accompanying drawings. FIG. 1 shows a schematic configuration of the semiconductor integrated circuit of the first embodiment. The semiconductor integrated circuit has an MEMS-type variable capacitance capacitor 10, and a driver IC 20 which controls the capacitor 10. The MEMS-type variable capacitance capacitor 10 and the driver IC 20 may be formed on the same silicon substrate (not shown). Needless to say, however, both MEMS-type variable capacitance capacitor 10 and driver IC 20 may be formed on separate silicon substrates, and may be connected together via wirings.

<Configuration of MEMS-Type Variable Capacitance Capacitor 10>

FIG. 1 shows an example configuration of the MEMS-type variable capacitance capacitor 10.

The MEMS-type variable capacitance capacitor 10 has a movable part 12 and a fixed part 13 each extending from an anchor part 11 fixed to a substrate (not shown). An upper electrode 14 and a lower electrode 13 are formed on the movable part 12 and the fixed part 15, respectively. The lower electrode 15 has an insulating film 16 which is formed on a surface thereof and which is formed of a silicon oxide or the like to suppress any short-circuiting with the upper electrode 14.

The movable part 12 on which the upper electrode 14 is formed is movable relative to the anchor part 11 (substrate) by elastic force. Accordingly, the upper electrode 14 can physically move relative to the lower electrode 15. The electrostatic capacitance Crf of the capacitor configured by the upper electrode 14 and the lower electrode 15 changes in accordance with a distance between both electrodes. The capacitor is connected to a circuit which needs a variable capacitance. The fixed part 13 is fixed relative to the anchor part 11.

The upper electrode 14 and the lower electrode 15 have main electrodes 14a, 15a, respectively, for retaining charges, and also have auxiliary electrodes 14b, 15b, respectively, for reducing or maintaining the distance d between the main electrodes 14a, 15a. As a voltage (deformation voltage Vact) for reducing the distance d is applied between the auxiliary electrodes 14b, 15b, the distanced can be reduced by Coulomb force.

Conversely, as voltage application between the auxiliary electrodes 14b, 15b is stopped, the movable part 12 returns to the original position by elastic force. Accordingly, after the distance d between the main electrodes 14a, 15a is reduced, when the distance d is kept constant by continuously applying a constant voltage (hold voltage Vhold) between the auxiliary electrodes 14b, 15b, the increased capacitance Crf can be maintained.

The hold voltage Vhold is lower than the deformation voltage Vact. This is because electrostatic attraction between the main electrodes 14a, 15a is in inverse proportion to square of the distance d. When the distance d is small, a high voltage like the deformation voltage Vact is not required to maintain the distance d against elastic force. Setting the hold voltage Vhold to be lower than the deformation voltage Vact reduces the amount of charges trapped in the insulating film 16 sandwiched between the auxiliary electrodes 14b, 15b, resulting in improvement of the reliability. Such a voltage applied between the auxiliary electrodes 14b, 15b is generated by a booster circuit in the driver IC 20.

Figure 2:
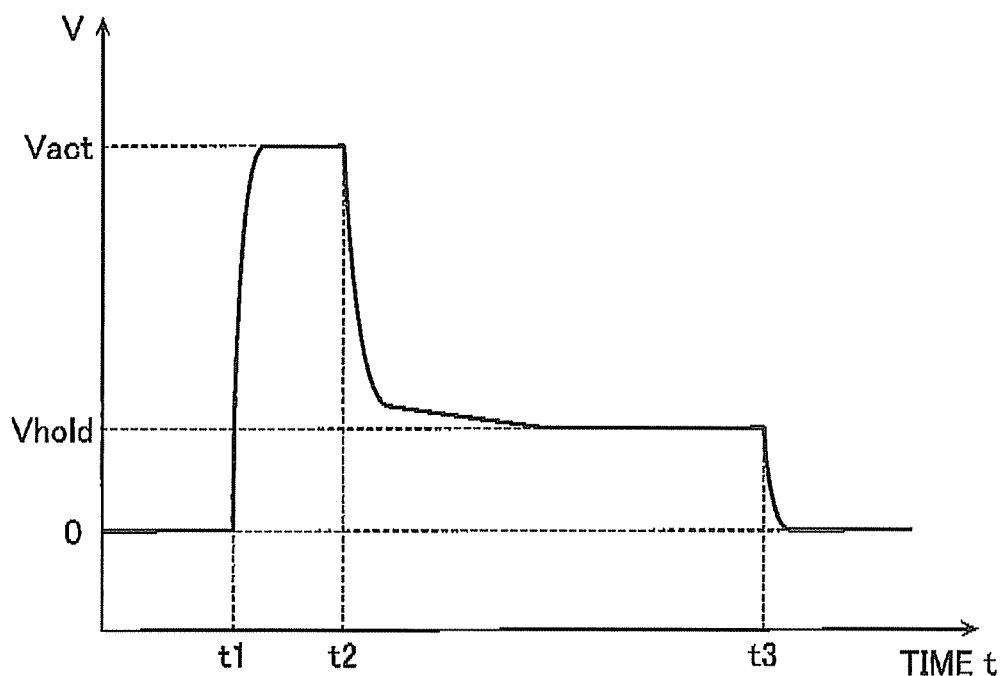
FIG. 2 is a diagram showing a change relative to a time in a voltage generated by a driver IC 20 and supplied between auxiliary electrodes 14b, 15b when a distance d between main electrodes 14a, 15a of an MEMS-type variable capacitance capacitor 10 shown in FIG. 1 is changed or maintained.

FIG. 2 shows a change relative to a time in a voltage generated by the driver IC 20 and supplied between the auxiliary electrodes 14b, 15b when the distance d is changed or maintained. First, at a time t1, the foregoing deformation voltage Vact is applied between the auxiliary electrodes 14b, 15b to reduce the distance d.

After the distance d is reduced, at a time t2, the hold voltage Vhold is applied between the auxiliary electrodes 14b, 15b. The voltage Vhold is necessary for maintaining the distance d constant and is lower than the deformation voltage Vact. Accordingly, the capacitance Crf increased due to reduction of the distance d can be maintained high.

Thereafter, when it becomes unnecessary to maintain the distance d constant, at a time t3, the voltage is set back to 0 V. Note that it is preferable that a period of applying the deformation voltage Vact should be short from the standpoint of maintaining the reliability of the MEMS-type variable capacitance capacitor 10 and of reducing power consumption. For example, equal to 20 μA or less is recommended.

<Entire Configuration of Driver IC 20>

Next, an explanation will be given of a specific configuration of the driver IC 20 with reference to a block diagram of FIG. 3. The driver IC 20 has a pump circuit 21A, an oscillating circuit 22A, a limiter circuit 23A, a discharging circuit 24A, a local pump circuit 25A, and an nMOS transistor 26A which are elements for generating and supplying the deformation voltage Vact.

The driver IC 20 also has a pump circuit 21B, an oscillating circuit 22B, a limiter circuit 23B, a discharging circuit 24B, a local pump circuit 25B, and an nMOS transistor 26B which are elements for generating and supplying the hold voltage Vhold.

The hold voltage Vhold has an application period which is overwhelmingly longer than that of the deformation voltage Vact. Accordingly, regarding the pump circuit 21B, the oscillating circuit 22B, the limiter circuit 23B, and the local pump circuit 25B, ones having low power consumption can be used. The driver IC 20 further has a bandgap reference circuit 27 which supplies a reference voltage to the limiter circuits 23A, and 23B.

The nMOS transistor 26A and the nMOS transistor 26B complementary turn on, so that a voltage generated by the pump circuit 21A or a voltage generated by the pump circuit 213 is selectively supplied to an output terminal OUT.

As explained above, according to the driver IC 20 of the embodiment, a circuit group for generating and supplying the deformation voltage Vact and a circuit group generating and supplying the hold voltage Vhold are separately provided. During a period when the deformation voltage Vact is applied for deformation of the MEMS-type variable capacitance capacitor 10, the nMOS transistor 26A is turned on, while the nMOS transistor 26B is turned off. When an applied voltage is changed from the deformation voltage Vact to the hold voltage Vhold, the nMOS transistor 26A is turned off from a conduction state, while the nMOS transistor 268 is turned on from the non-conduction state.

As explained above, as the circuit group for generating and supplying the deformation voltage Vact and the circuit group for generating and supplying the hold voltage Vhold are separately provided and as the transistors 26A, 26B perform a switching operation, power consumption can be reduced. According to a configuration that the deformation voltage Vact and the hold voltage Vhold are supplied from a single-output circuit group (one charge pump circuit, one oscillating circuit, and one limiter circuit), it is difficult to accomplish both improvement of a voltage supply performance and reduction of power consumption simultaneously. That is, in order to supply the deformation voltage Vact which is a high voltage, it is necessary to increase the number of chain-connected charge pump circuits. However, if such a large number of the charge pump circuits are used not only for generating the voltage Vact but also for generating the voltage Vhold, it is impossible to reduce power consumption. Therefore, in the embodiment, by separately providing the circuit group for supplying the deformation voltage Vact and the circuit group for supplying the hold voltage Vhold, and by performing a switching operation, improvement of the voltage supply performance and reduction of power consumption are both accomplished simultaneously.

As the driver IC 20 has individual circuit blocks configured as will be discussed later, it is possible to make the deformation voltage Vact and the hold voltage Vhold substantially constant regardless of a change in a power supply voltage, a change in a surrounding temperature, and a variation originating from a manufacturing process.

Figure 3:
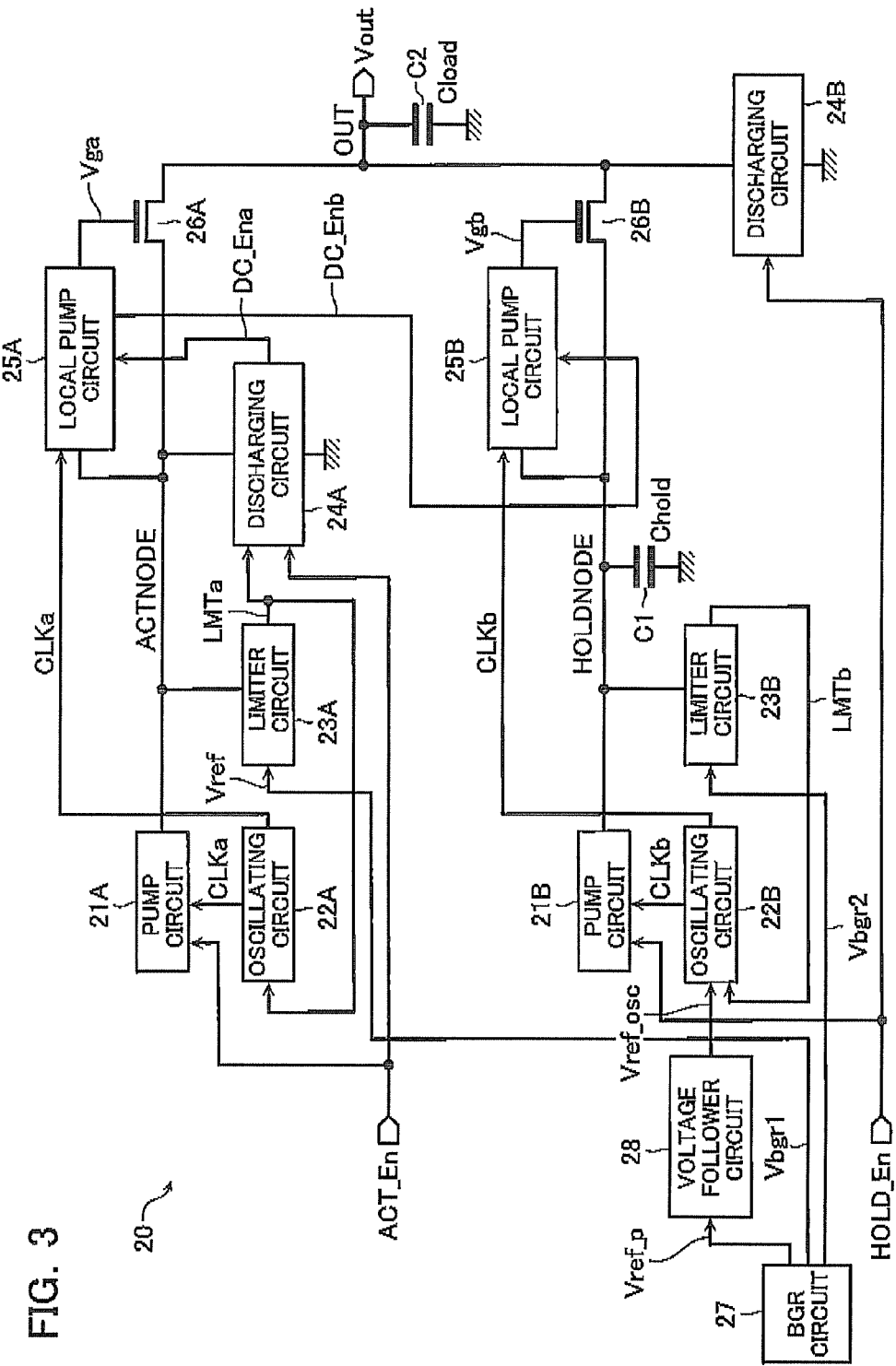
FIG. 3 is a block diagram showing a specific configuration of the driver IC shown in FIG. 1.

When the configuration shown in FIG. 3 is employed, however, the drain-source voltage of the nMOS transistor 26A, 26B greatly changes, so that there may be a problem with the reliability due to aged deterioration of the nMOS transistor 26A, 26B. As will be clear from a later explanation, according to the embodiment, such deterioration of the transistor 26A, 26B and the problem with the reliability are avoided, when a voltage applied to the MEMS-type variable capacitance capacitor 10 is changed from the deformation voltage Vact to the hold voltage Vhold.

The pump circuit 21A boosts, in accordance with a control signal ACT_En, a supply voltage every time a clock signal CLKa supplied from the oscillating circuit 22A rises, and outputs the boosted voltage to an output node ACTNODE. The limiter circuit 23A detects whether or not an output voltage from the output node ACTNODE exceeds a predetermined upper limit based on a reference voltage Vbgr1 supplied from the bandgap reference circuit 27. When the output voltage exceeds the upper limit, the limiter circuit 23A outputs a limiter signal LMTa to terminate an operation of the oscillating circuit 22A. The discharging circuit 24A is configured to start an operation of discharging the output node ACTNODE after a predetermined time elapses from when the control signal ACT_En changes to "L".

The local pump circuit 25A further boosts the voltage of the output node ACTNODE in accordance with the clock signal CLKa. The nMOS transistor 26A is turned on by a gate voltage Vga, and has a function of transferring the voltage of the output node ACTNODE to the output node OUT. The gate voltage Vga is higher than the voltage Vact of the output node ACTNODE to be transferred by a threshold voltage of the transistor 26A. Note that a capacitor C2 (capacitance: Cload) is provided between the output node OUT and a ground potential for the purpose of potential stabilization.

The pump circuit 21B boosts, in accordance with a control signal HOLD_En, a supply voltage every time a clock signal CLKb supplied from the oscillating circuit 22B rises, and outputs the boosted voltage to an output node HOLDNODE. The oscillating circuit 22B supplies the clock signal CLKb based on a voltage Vref_osc supplied from the bandgap reference circuit 27 through a voltage follower circuit 28. The clock signal CLKb may have a smaller frequency than that of the clock signal CLKa. This is because the hold voltage Vhold is lower than the deformation voltage Vact.

The limiter circuit 23B detects whether or not an output voltage from the output node HOLDNODE of the pump circuit 21B exceeds a predetermined upper limit based on a reference voltage Vbgr2 supplied from the bandgap reference circuit 27. When the output voltage exceeds the upper limit, the limiter circuit 23B outputs a limiter signal LMTb to terminate an operation of the oscillating circuit 22B. Note that a capacitor C1 (capacitance: Chold) is provided between the output node HOLDNODE and a ground potential for the purpose of potential stabilization. The discharging circuit 24B performs an operation of pulling out charges in the capacitor C2 connected to the output terminal OUT to return the voltage of the output node OUT to 0 V after an operation of applying the hold voltage Vhold is terminated.

The local pump circuit 25B further boosts the voltage of the output node HOLDNODE in accordance with the clock signal CLKb. Note that the local pump circuit 25B starts its operation as receiving an enable signal DC_enb from the local pump circuit 25A. The nMOS transistor 26B is turned on by a gate voltage Vgb, and has a function of transferring the voltage of the output node HOLDNODE to the output node OUT. The gate voltage Vgb is higher than the voltage Vhold of the output node HOLDNODE to be transferred by a threshold voltage of the transistor 26B. The bandgap reference circuit 27 outputs reference voltages Vref_p and Vref_n which do not depend on a temperature and the supply voltage. The voltage follower circuit 28 outputs an output voltage Vref_osc as the reference voltages Vref_p and Vref_n are input.

<Pump Circuit 21A, 21B>

Figure 4:
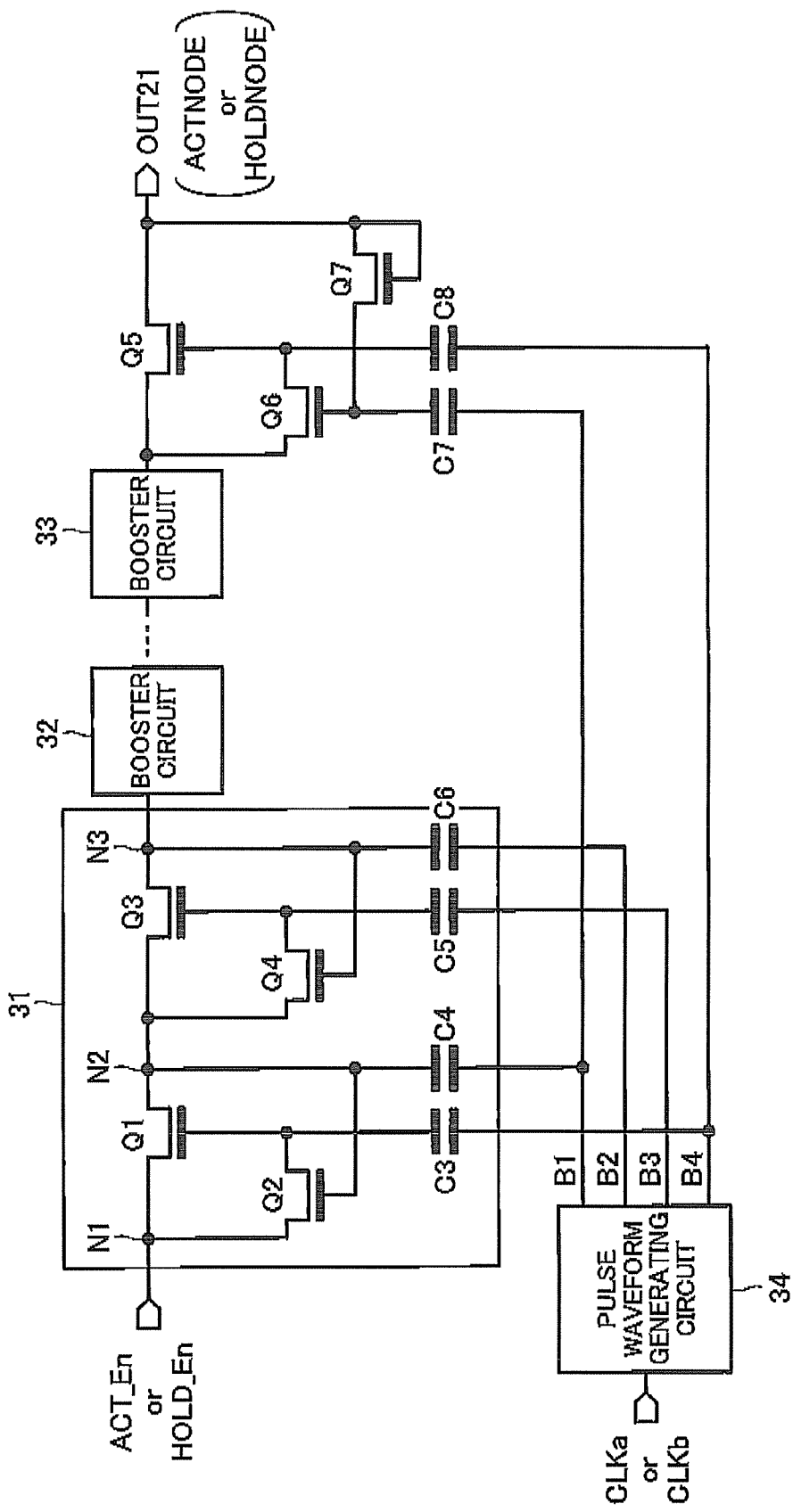
FIG. 4 is a circuit diagram showing a specific configuration of pump circuit 21A, 21B.

FIG. 4 is a circuit diagram showing a specific configuration of the pump circuit 21A, 21B. As shown in FIG. 4, the pump circuit 21A, 21B has booster circuits 31, 32, and 33 of multistage (in the figure, six), and a pulse waveform generating circuit 34. Each of the booster circuits 31, 32, and 33 has nMOS transistors Q1 to Q4 and capacitors C3 to C6.

The nMOS transistor Q1 is connected in such a manner as to have a current path between a node N1 which is an input terminal for the control signal ACT_En or HOL_En and a node N2, and functions as a transfer transistor. The nMOS transistor Q2 is connected in such a manner as to have a current path between the node N1 and a gate of the nMOS transistor Q1, and has a gate connected to the node N2. The nMOS transistor Q2 functions as a pre-charging transistor which boosts a gate voltage to the transistor Q1.

The nMOS transistor Q3 is connected in such a manner as to have a current path between the node N2 and a node N3, and functions as a transfer transistor. The nMOS transistor Q4 is connected in such a manner as to have a current path between the node N2 and a gate of the nMOS transistor Q3, and has a gate connected to the node N3. The nMOS transistor Q4 functions as a pre-charging transistor which boosts a gate voltage to the transistor Q3.

The capacitors C3, C5 have respective one ends connected to the gates of the nMOS transistors Q1, Q3. The capacitors C4, C6 have respective one ends connected to the nodes N2, N3. Pulse signals B1 to B4 are supplied to respective another ends of the capacitors C3 to C4 from the pulse waveform generating circuit 34. The pulse signals B1 to B4 are four-phase signals having phases differing from one another 90 degree by 90 degree.

Note that nMOS transistors Q5, Q6 and capacitors C7, C8 also configure a booster circuit formed following the booster circuit 33. The nMOS transistor Q5 is connected in such a manner as to have a current path between an output terminal of the booster circuit 33 and an output 26 node OUT21 (the output node ACTNODE or HOLDNODE). In contrast, the nMOS transistor Q6 is connected in such a manner as to have a current path between the output terminal of the booster circuit 33 and a gate of the nMOS transistor Q5. The capacitors C7, C8 have respective one ends connected to gates of the nMOS transistors Q6, Q5. The pulse signals B1, B4 are supplied to respective another ends of the capacitors C7, C8. An nMOS transistor Q7 is connected between the output node OUT21 and the gate of the nMOS transistor Q6 in a diode connection manner. The nMOS transistor Q7 functions as a pre-charging transistor which boosts a gate voltage to the nMOS transistor Q6.

Note that because the hold voltage Vhold is lower than the deformation voltage Vact and the capacitor C2 has been already charged when the hold voltage Vhold is applied, the number of booster circuits in the pump circuit 21B can be smaller than the number of booster circuits in the pump circuit 21A.

<Oscillating Circuit 22A>

Next, an explanation will be given of a specific example of the oscillating circuit 22A with reference to FIG. 5. The oscillating circuit 22A is a ring oscillator having plural CMOS inverters 41 connected in a ring-like manner (closed loop). A capacitor 42 (capacitance: C) is connected between individual CMOS inverters 41, and another end of the capacitor 42 is grounded. Moreover, a resistor 46 (resistance: R) is connected between a pMOS transistor and an nMOS transistor both configuring each CMOS inverter 41. Based on a delay defined by the resistance R and the capacitance C, a frequency of the clock signal CLKa output by the oscillating circuit 22A is set.

A pMOS transistor 43 is connected between an output terminal in the rearmost inverter 41 and a power terminal. An nMOS transistor 44 is connected between a source of an nMOS transistor in the rearmost inverter 41 and a ground terminal. A limiter signal LMTa or LMTb is input to gates of both transistors 43, 44 via an inverter 45. The limiter signals LMTa, LMTb are output by the limiter circuits 23A, 23B, respectively. As the pMOS transistor 43 and the nMOS transistor 44 turn on, the oscillating circuit 22A stops an oscillation operation.

<Limiter Circuit 23A, 23B>

Figure 6:
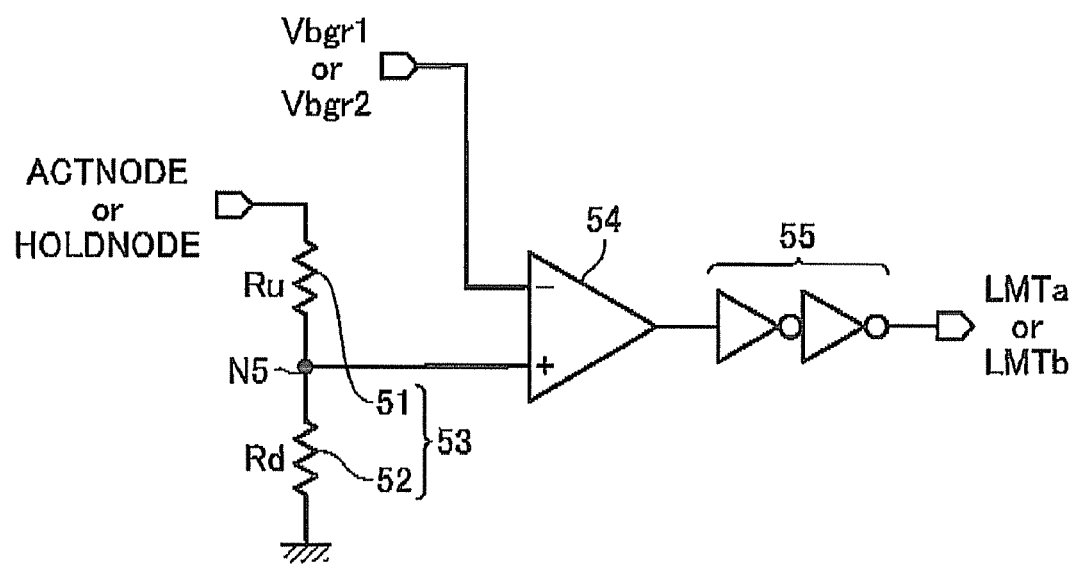
FIG. 6 is a circuit diagram showing a specific configuration of limiter circuit 23A, 23B.

Next, an explanation will be given of a specific configuration of the limiter circuit 23A, 23B with reference to FIG. 6. The limiter circuits 23A, 2313 have the same configuration each other, and respectively have a divided resistor 53 comprising a resistor 51 (resistance: Ru), a resistor 52 (resistance; Rd) connected in series via a connection node N5, a differential amplifier 54, and an inverter 55.

One end of the resistor 51 is connected to the output terminal OUT (node ACTNODE or HOLDNODE) of the pump circuit 21A or pump circuit 21B. One end of the resistor 52 is connected to a ground terminal.

The differential amplifier 54 has an inverting input terminal to which the reference voltage Vbgr1 or Vbgr2 generated by the bandgap reference circuit 25 is applied, and has a non-inverting input terminal to which a voltage from the connection node N5 is applied. An output signal by the differential amplifier 54 is input to the inverter 55. An output signal by the inverter 55 is the foregoing limiter signal LMT. That is, when a voltage at the connection node N5 of the divided resistor 53 becomes greater than or equal to the reference voltage Vbgr1 or Vbgr2, the limiter signal LMT rises from "L" to "H", and the oscillating circuit 22A stops its operation. Note that the limiter circuit 23A and the limiter circuit 23B have a different divisional resistance ratio of the divided resistor 53, and the divisional resistance ratio of the latter is smaller than that of the former.

As the resistance (Ru+Rd) of the divided resistor 53 is increased, a bias current flowing through the limiter circuit 23A, 23B can be decreased. When the bias current is decreased, however, a response speed of the limiter circuit 23A, 23B is reduced, so that a ripple of a voltage at the output node ACTNODE, HOLDNODE becomes large. In this case, however, such ripple can be suppressed by increasing the capacitance Chold of the capacitor C1.

<Discharging Circuit 24A>

Figure 7:
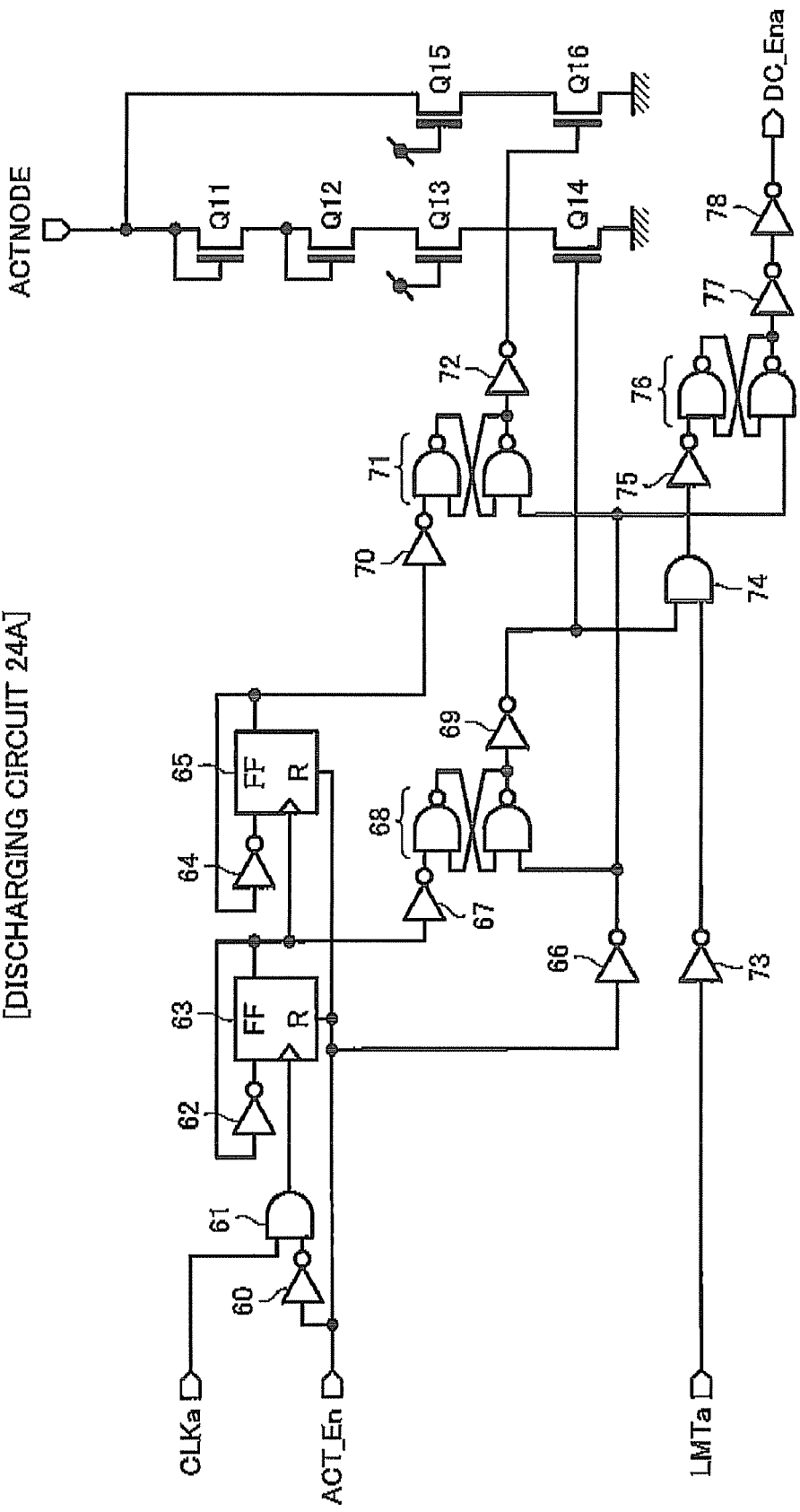
FIG. 7 is a circuit diagram showing a specific configuration of a discharging circuit 24A.

Next; an explanation will be given of a specific configuration of the discharging circuit 24 with reference to FIG. 7. As explained above, the discharging circuit 24A starts an operation of discharging the output node ACTNODE after a predetermined time elapses from when the control signal ACT_En changes to "L".

The discharging circuit 24A has an inverter 60, an AND gate 61, an inverter 62, a flip-flop 63, an inverter 64, and a flip-flop 65. The control signal ACT_En is input to an input terminal of the inverter 60, and an output terminal thereof is connected to one input terminal of the AND gate 61. The clock signal CLKa is input to another input terminal of the AND gate 61. An output terminal of the AND gate 61 is connected to one input terminal of the flip-flop 63.

The inverter 62 has an input terminal connected to an output terminal of the flip-flop 63, and has an output terminal connected to another input terminal of the flip-flop 63. The same is true of a connection of the inverter 64 and the flip-flop 65. The output terminal of the flip-flop 63 is also connected to an input terminal of the flip-flop 65. The control signal ACT_En is supplied to reset terminals of the flip-flops 63, 65, respectively. Accordingly, the inverters 62, 64, and the flip-flops 63, 65 output a signal delayed by a predetermined time from the clock signal CLKa to the inverter 70 after the control signal ACT_En rises.

The output terminals of the flip-flops 63, 65 are also connected to respective one input terminals of latch circuits 68, 71, via the inverters 67, 70.

An inversion signal /ACT_En of the control signal ACT_En is supplied to another input terminal of the latch circuit 68 by an inverter 66. Likewise, the inversion signal/ ACT_En of the control signal ACT_En is supplied to another input terminal of the latch circuit 71 by the inverter 66. Inversion signals of output signals of the latch circuits 68, 71 are supplied to transistors Q14, Q16 via inverters 69, 72, respectively.

NMOS transistors Q11 to Q14 are connected in series between the output node ACTNODE and a ground terminal, and nMOS transistors Q15, Q16 are connected in series therebetween. The nMOS transistors Q11, Q12 are connected in a diode connection manner, and a predetermined power supply voltage is supplied to respective gates of the nMOS transistors Q13, Q15. The nMOS transistor Q14, Q16 turns ON in accordance with a condition of the latch circuit 68, 71, and the output node ACTNODE is discharged. The nMOS transistor Q14 turns ON faster than the nMOS transistor Q16, and discharges the output node ACTNODE to a predetermined potential. Next, the nMOS transistor Q16 turns ON, and discharges the output node ACTNODE to a ground potential.

The limiter signal LMTa is input to an inverter 73. An output terminal of the inverter 73 is connected to one input terminal of an AND gate 74. An inversion signal of an output signal by the latch circuit 68 is input to another input terminal of the AND gate 74 by the inverter 69. The AND gate 74 has an output terminal connected to an inverter 75, and the inverter 75 has an output terminal connected to one input terminal of a latch circuit 76. An output signal by the latch circuit 76 is output to the local pump circuit 25A as an output signal DC_Ena via two inverters 77, 78.

<Local Pump Circuit 25A>

Figure 8:
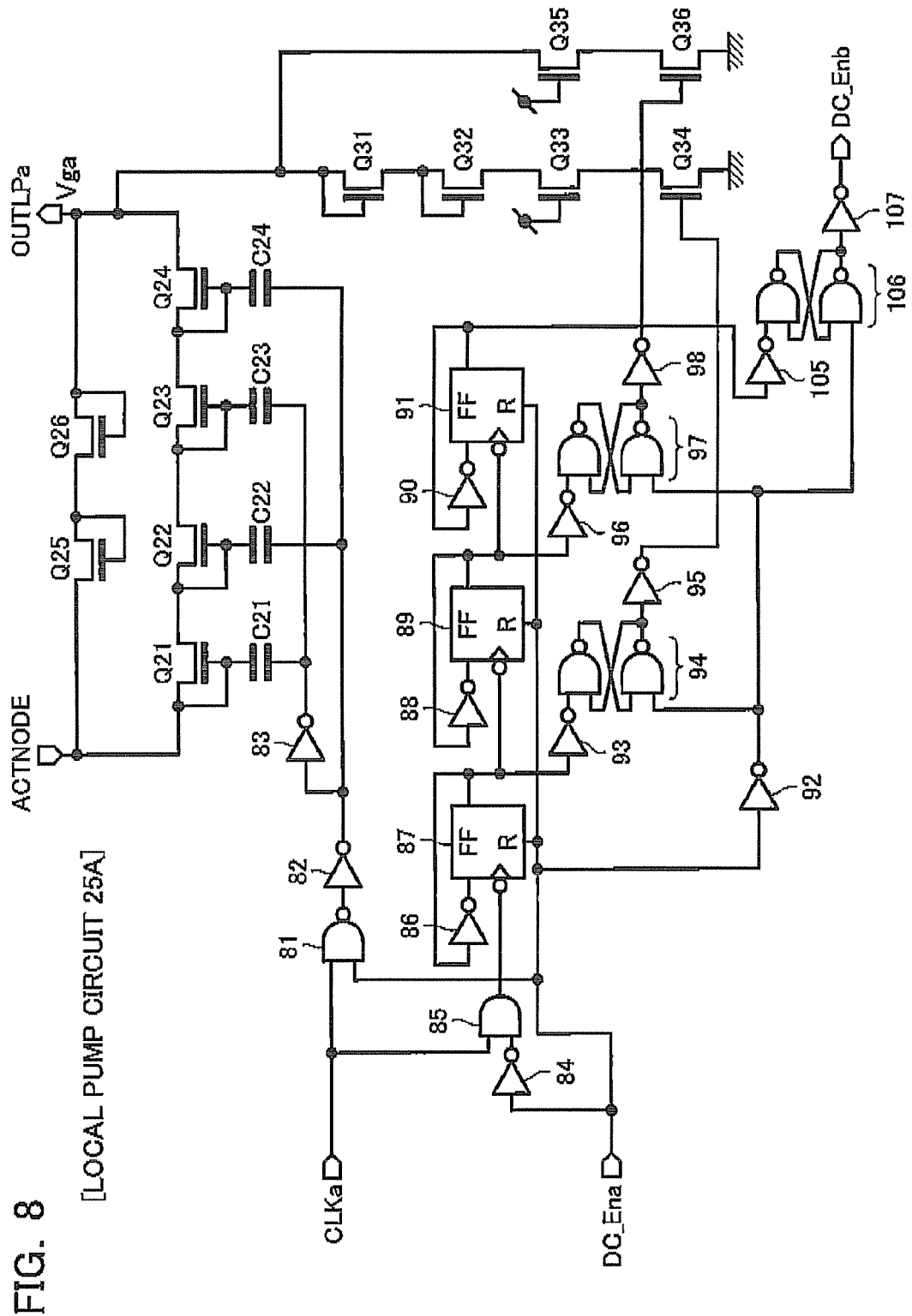
FIG. 8 is a circuit diagram showing a specific configuration of a local pump circuit 25A.

Next, an explanation will be given of a specific configuration of the local pump circuit 25A with reference to FIG. 8. The local pump circuit 25A shown in FIG. 8 is a charge pump circuit which boosts a voltage at the output node ACTNODE, generates a gate voltage Vga input to the gate of the nMOS transistor 26A, thereby controlling the turn on/OFF of the nMOS transistor 26A. The local pump circuit 25A terminates an operation of boosting a voltage at the output node ACTNODE to generate the boosted voltage Vga after the output signal DC_Ena="L" is input from the discharging circuit 24A, and discharges an output terminal OUTLPa after a predetermined time elapses. A timing of discharging the output terminal OUTPa is set to be later than a timing that the discharging circuit 24A discharges the output node ACTNODE. This suppresses any application of a high voltage between drain-source of the nMOS transistor 26A, thereby suppressing any characteristic degradation of the nMOS transistor 26A.

That is, the local pump circuit 25A has nMOS transistors Q21 to Q24 connected in series between the output node ACTNODE and the output terminal OUTLPa. The nMOS transistors Q21 to Q24 are connected in a diode connection manner so that a direction from the output node ACTNODE to the output terminal OUTLPa becomes a forward direction. The nMOS transistor Q21 to Q24 has a capacitor C21 to C24 connected to a gate thereof. Moreover, nMOS transistors Q25, Q26 are connected between the output node ACTNODE and the output terminal OUTLPa in a diode connection manner so that a direction from the output terminal OUTLPa to the output node ACTNODE becomes a forward direction.

A NAND gate 81 and inverters 82, 83 are provided as a configuration which inputs a signal based on the clock signal CLKa to respective another ends of the capacitors C21 to C24 to perform a charge pump operation. The clock signal CLKa is input to one input terminal of the NAND gate 81, and the output signal DC_Ena which is an output signal from the discharging circuit 24A is input to another input terminal of the NAND gate 81.

An input terminal of the inverter 82 is connected to an output terminal of the NAND gate 81. An output terminal of the inverter 82 is connected to individual another ends of the capacitors C22, C24. The inverter 83 has an input terminal connected to the output terminal of the inverter 82, and has an output terminal connected to individual another ends of the capacitors C21, C23.

As the clock signal CLKa is input, a voltage at the output node ACTNODE is transferred through the transistors Q21 to Q24, and the voltage Vga at the output terminal OUTLPa is boosted. When the voltage Vga at the output terminal OUTLPa becomes too high, charges return to the output node ACTNODE through the transistors Q26, Q25, so that the voltage Vga at the output terminal OUTLPa is lowered.

The local pump circuit 25A further has an inverter 84, an AND gate 85, an inverter 86, a flip-flop 87, an 6 inverter 88, a flip-flop 89, an inverter 90, and a flip-flop 91.

The output signal DC_Ena is input to an input terminal of the inverter 84, and an output terminal thereof is connected to one input terminal of the AND gate 85. The clock signal CLKa is input to another input terminal of the AND gate 85. An output terminal of the AND gate 85 is connected to one input terminal of the flip-flop 87.

The inverter 86 has an input terminal connected to an output terminal of the flip-flop 87, and has an output terminal connected to another input terminal of the flip flop 87. The same is true of a connection of the inverter 88 and the flip-flop 89, and also of a connection of the inverter 90 and the flip-flop 91. An output terminal of the flip-flop 87 is connected to an input terminal of the flip-flop 89. An output terminal of the flip-flop 89 is connected to an input terminal of the flip-flop 91. The output signal DC_Ena is also supplied to respective reset terminals of the flip-flops 87, 89, and 91. Accordingly, the inverters 86, 88, 90 and the flip-flops 87, 89, 91 output a signal delayed by a predetermined time from the clock signal CLKa to an inverter 105 after the output signal DC_Ena rises.

Output terminals of the flip-flops 87, 89 are connected to respective one input terminals of latch circuits 94, 97 via inverters 93, 96. An inversion signal /DC_Ena of the control signal DC_Ena is supplied 6 to respective another input terminals of the latch circuits 94, 97 by an inverter 92. Inversion signals of output signals of the latch circuits 94, 97 are supplied to respective transistors Q34, Q36 via inverters 95, 98.

NMOS transistors Q31 to Q34 are connected in series between the output terminal OUTLPa and a ground terminal, and nMOS transistors Q35, Q36 are also connected in series therebetween. The nMOS transistors Q31, Q32 are connected in a diode connection manner, and the nMOS transistors Q33, Q35 respectively have gates to which a predetermined power supply voltage is supplied. The nMOS transistor Q34, Q36 turns ON in accordance with a condition of the latch circuit 94, 97, and the output terminal OUTLPa is discharged.

The nMOS transistor Q34 turns ON faster than the nMOS transistor Q36, and the nMOS transistor Q36 turns ON following the nMOS transistor Q34. As the nMOS transistor Q34 turns ON, because of the presence of the nMOS transistor Q31 and the nMOS transistor Q32 connected in a diode connection manner, a voltage at the output terminal OUTLPa is lowered to twice as much as a forward voltage of the diode. Subsequently, as the nMOS transistor Q36 turns ON, the voltage at the output terminal OUTLPa is lowered to a ground potential.

Moreover, there are provided a latch circuit 106 having input terminals to which an output signal of an inverter 105 and an inversion signal of the output signal DC_Ena are supplied, respectively, and an inverter 107 which inverts an output signal of the latch circuit 106. An output signal by the inverter 107 is supplied to the local pump circuit 25B to be discussed later as an output signal DC_Enb.

<Oscillating Circuit 22B>

Figure 9:
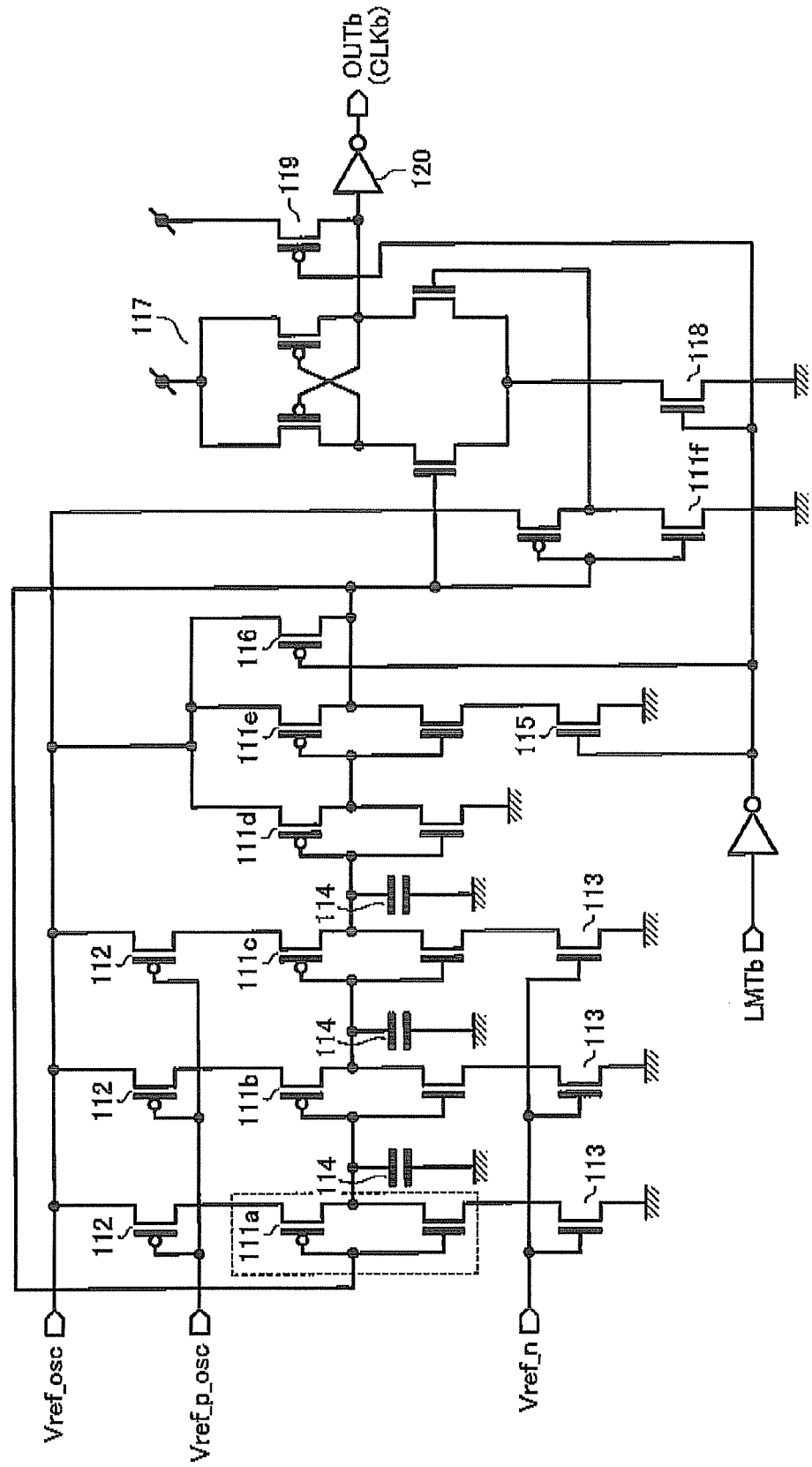
FIG. 9 is a circuit diagram showing a specific configuration of an oscillating circuit 22D.

Next, an explanation will be given of a specific configuration of the oscillating circuit 22B with reference to FIG. 9. Like the oscillating circuit 22A shown in FIG. 5, the oscillating circuit 22B shown in FIG. 9 is a ring oscillator having plural CMOS inverters 111 (111a to 111e) connected in a ring-like manner. A capacitor 114 is connected between a ground terminal and each node between the plural CMOS inverters 111a to 111d.

Figure 5:
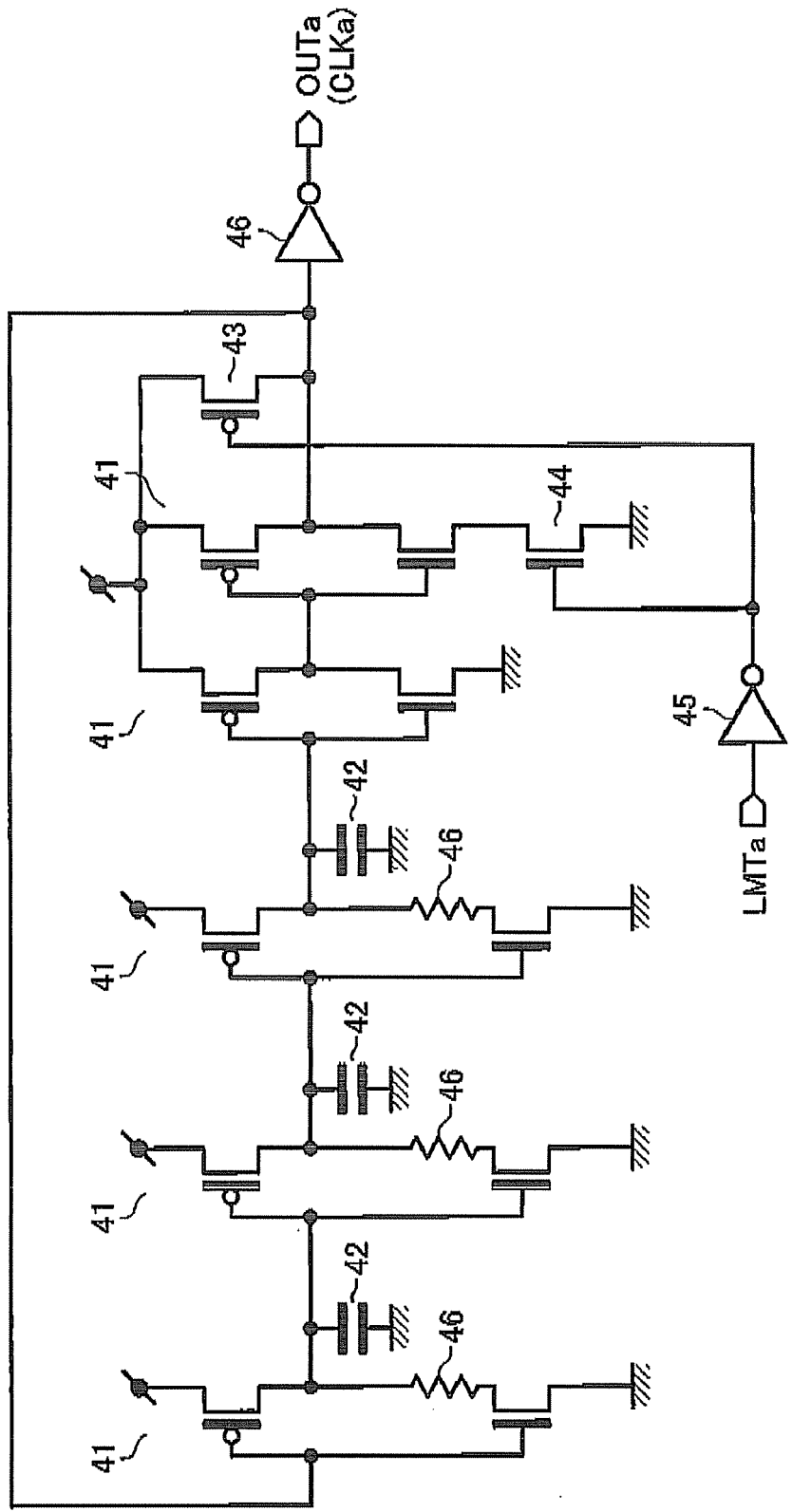
FIG. 5 is a circuit diagram showing a specific configuration of an oscillating circuit 22A.

In the embodiment, however, each CMOS inverter 111 does not have the resistor 46 in FIG. 5, but has a constant current circuit which allows a constant current to flow from a constant current source using a current mirror circuit. The CMOS inverters 111 are driven by voltages Vref_osc and Vref_p_osc generated by the voltage follower circuit 28 based on a constant voltage supplied from the bandgap reference circuit 27. Accordingly, an oscillating circuit having a delay time which does not depend on a power supply voltage, a temperature, and a process is realized, thus ensuring stabilization of the voltage Vhold. Some of the plural inverters 111 (in FIG. 9, first three inverters 111a to 111c) have one ends connected to respective pMOS transistors 112, and have another ends connected to respective nMOS transistors 113. The voltage Vref_osc supplied from the voltage follower circuit 28 is commonly applied to respective sources of the pMOS transistors 112, and respective sources of the nMOS transistors 113 are grounded.

The voltage Vref_p_osc supplied from the voltage follower circuit 28 is supplied to respective gates of the pMOS transistors 112, and a voltage Vref_n is supplied to respective gates of the nMOS transistors 113.

The fourth CMOS inverter 111d does not have a pMOS transistor 112, and the voltage Vref_osc is directly supplied to the CMOS inverter 111d, and another end thereof is grounded. The voltage Vref_osc is also directly supplied to the last CMOS inverter 111e, and another end thereof is connected to a drain of an nMOS transistor 115. A source of the nMOS transistor 115 is grounded. A pMOS transistor 116 is connected between an output terminal of the inverter 111e and an output terminal for the voltage Vref_osc.

An inversion signal of the limiter signal LMTb is supplied to a gate of the nMOS transistor 115 and that of the pMOS transistor 116. That is, when a voltage at the output node HOLDNODE exceeds an upper limit, the oscillating circuit 22B terminates its oscillation operation.

A level shifter 117 is connected to the last CMOS inverter 111e. An output terminal of the level shifter 117 is connected to an inverter 120, and an output signal by the inverter 120 is output as the clock signal CLKb. Note that a pMOS transistor 119 is for fixing an output terminal of the level shifter 117 to a power source potential based on the limiter signal LMPb. An inverter 111f is for generating an inversion signal of an output signal of the last CMOS inverter 111e, and for supplying such inversion signal to one input terminal of the level shifter 117.

<Local Pump Circuit 25B>

Figure 10:
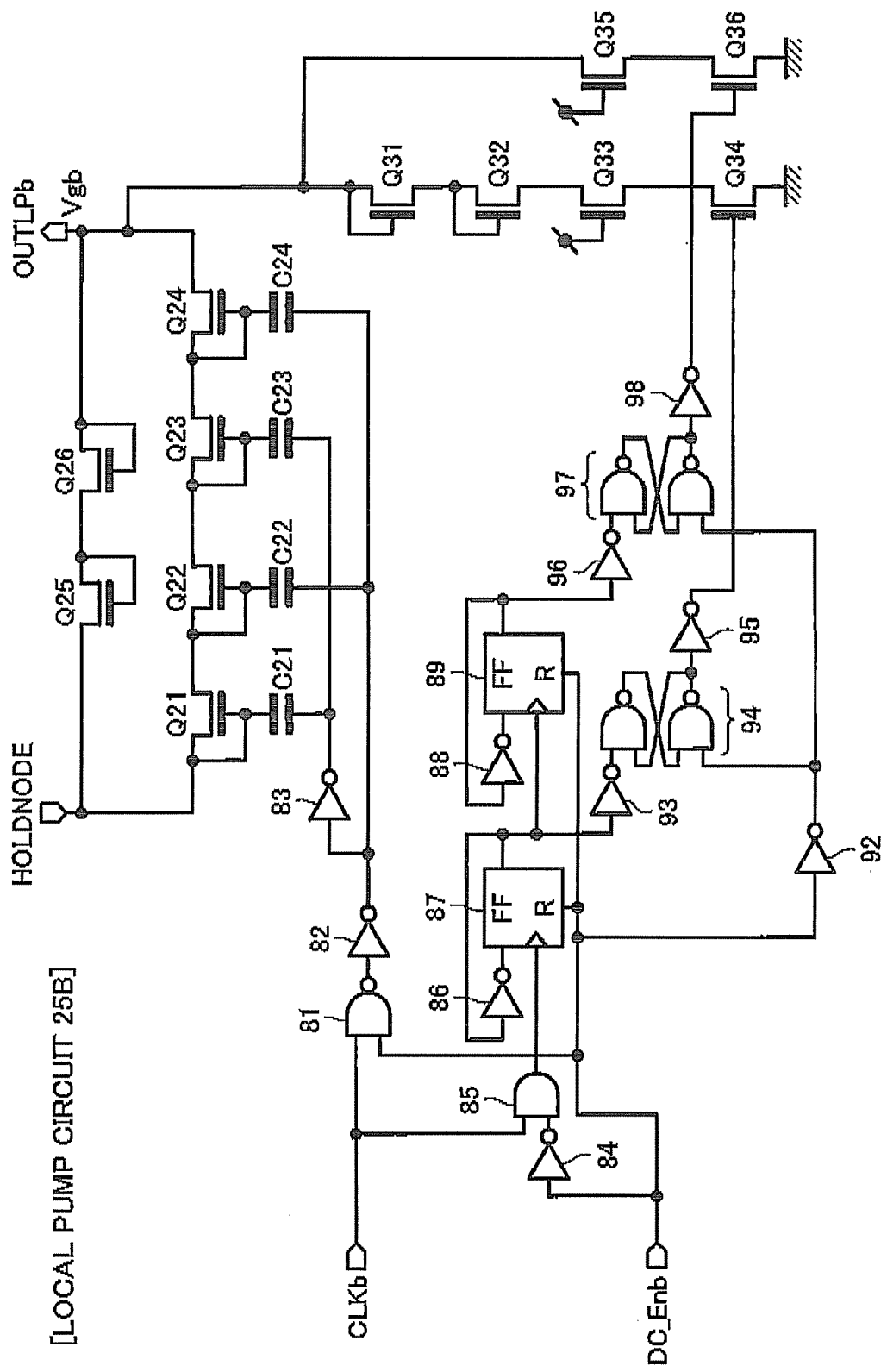
FIG. 10 is a circuit diagram showing a specific configuration of a local pump 25B with reference to FIG. 8.

Next, an explanation will be given of a specific 16 configuration of the local pump circuit 25B with reference to FIG. 10. The local pump circuit 25B in FIG. 10 is a charge pump circuit which boosts a voltage at the output node HOLDNODE after the output signal DC_Enb from the local pump circuit 25A rises, and outputs a boosted voltage VGb from an output terminal OUTLPb. Regarding the specific configuration of the local pump circuit 25B, the difference from the local pump circuit 25A is that the local pump circuit 25B does not have the flip-flop circuit 91, the inverters 105, 107 and the latch circuit 106, but other elements are same. The same elements as those in FIG. 8 are denoted by the same reference numerals in FIG. 10, and detailed explanations thereof will be omitted.

<Bandgap Reference Circuit 27>

Next, an explanation will be given of a specific configuration of the bandgap reference circuit 27 with reference to FIG. 11. As explained above, the bandgap 6 reference circuit 27 is designed to output the output voltages Vbgr1, Vbgr2 which do not depend on a power supply voltage, a surrounding temperature, a process, and the like. The bandgap reference circuit 27 has a node N11 and a node N12, and has plural current paths CP1 to CP6 between the node N11 or N12 and a ground terminal.

First, the first current path CP1 is formed by a pMOS transistor 131, a resistor 132 (resistance: R6), and a diode 133 (forward voltage: VF1) which are connected together in series.

The pMOS transistor 131 has a gate (node N13) connected to a non-inverting input terminal of a differential amplifier 138, and has a drain (node N14) connected to an inverting input terminal of a differential amplifier 139.

An output terminal of the differential amplifier 138 is connected to a gate of a pMOS transistor 139. A power supply voltage is supplied to a source of the pMOS transistor 139, and a drain thereof is connected to the node N11. The differential amplifier 138 controls a gate voltage of the pMOS transistor 139 in such a way that a voltage of the node N13 and that of the node N14 become equal. It is assumed that a current flowing through the pMOS transistor 131 is defined as I1, and a forward voltage of the diode 133 is defined as VF1.

The second current path CP2 is formed by a pMOS transistor 134, a resistor 135 (resistance: R7), a resistor 136 (resistance: R1), and N number of parallel-connected diodes 137 (forward voltage: VF2) which are connected together in series.

The pMOS transistor 134 has a drain and a gate both connected to the node N13, thus configuring a current mirror circuit together with the pMOS transistor 131. It is assumed that a current flowing through the pMOS transistor 134 is defined as I2, and a forward voltage of the diode 137 is defined as VF2.

Furthermore, it is assumed that a voltage applied to the resistor 136 based on a difference between the forward voltage VF1 of the diode 133 and the forward voltage VF2 of the diode 137 is defined as ΔVF (=VF1−VF2).

A voltage input to the differential amplifier 138 can be set high because the resistors 132, 135 are present. This allows a transistor in the differential amplifier 138 to operate in a saturation range, thereby reducing a gain relative to a voltage fluctuation. There may be an effect of a matching variability between the resistor 132 and the resistor 135, but a function of amplifying a noise relative to the node N14 can be suppressed. Accordingly, by providing the resistors 132, 135, a variability of the output voltage Vbgr1 of the bandgap reference circuit 27 can be reduced as a whole.

The third current path CP3 is formed by pMOS transistors 140, 151 and a variable resistor 144 (resistance: R2a). The pMOS transistor 140 is connected in such a manner as to have a current path between the node N11 and a node N15, and has a gate connected to a node N13. Accordingly, the pMOS transistor 140 configures a current mirror circuit together with the pMOS transistors 131, 134. It is assumed that a current flowing through the pMOS transistor 140 is defined as I3.

In contrast, the pMOS transistor 151 is connected in such a manner as to have a current path between a node N12 and the node N15, and has a gate connected to a node N20. It is assumed that a current flowing through the pMOS transistor 151 is defined as I4.

The resistance R2a of the resistor 144 is changed from a first value R2a1 to a second value R2a2 (<R2a1), which is smaller than the first value R2a1, by a non-illustrated controller at a time after a voltage at the output node ACTNODE reaches the deformation voltage Vact. Accordingly, the voltage Vbgr1 output by the bandgap reference circuit 27 is changed to a smaller value in comparison with a value before the resistance of the resistor 144 is changed. Note that a capacitor 157 is connected between the node N15 and a ground terminal via a resistor 155.

The node N13 is connected to a non-inverting input terminal of the differential amplifier 138. A gate of the pMOS transistor 151 is connected to the node N20. The node N20 is also connected to an output terminal of a differential amplifier 153. The variable resistor 144 is connected between the node N15 and a ground terminal.

The fourth current path CP4 is formed by a pMOS transistor 141, a pMOS transistor 150, and a variable resistor 145 (resistance: R2b). The pMOS transistor 141 is connected in such a manner as to have a current path between the node N11 and anode N16. The pMOS transistor 150 is connected in such a manner as to have a current path between the node N12 and the node N16.

A gate of the pMOS transistor 141 is connected to the node N13, and a gate of the pMOS transistor 150 is connected to the node N20. Accordingly, the pMOS transistor 141 configures a current mirror circuit together with the pMOS transistors 131, 134, and 140, and the pMOS transistor 150 configures a current mirror circuit together with the pMOS transistor 151.

The variable resistor 145 is connected between the node N16 and a ground terminal. Note that a capacitor 158 is connected between the node N16 and a ground terminal via a resistor 155.

The fifth current path CP5 is formed by pMOS transistors 142, 143, a resistor 146, and an nMOS transistor 147. The pMOS transistor 142 is connected in such a manner as to have a current path between the node N11 and a node N17, and has agate connected to the node N13 like the pMOS transistors 131, 134, 140, and 141, thereby configuring a current mirror circuit together with those transistors.

The pMOS transistor 143 is connected in such a manner as to have a current path between the node N12 and the node N17, and has a gate connected to the node N20, thereby configuring a current mirror circuit together with pMOS transistors 151, 152.

The resistor 146 and the nMOS transistor 147 are connected in series between the node N17 and a ground terminal. The nMOS transistor 147 is connected in a diode connection manner. A pMOS transistor 148 and an nMOS transistor 149 both connected in a diode connection manner are connected in series between a power supply voltage terminal and a ground terminal.

A gate (node N18) of the nMOS transistor 149 is connected to a gate and drain of the nMOS transistor 147. Terminals for outputting voltages Vref_p, Vref_n are connected to the node N18 and the node N19, respectively. Note that capacitors 159, 169 are connected between the node N18 and a ground terminal and the node N19 and a ground terminal, respectively.

The sixth current path CP6 is formed by the pMOS transistor 152 and a resistor 154 (resistance: RX) connected thereto in series. The pMOS transistor 152 is connected in such a manner as to have a current path between the node N12 and a node N21. Like the pMOS transistors 150, 151, the pMOS transistor 152 has a gate connected to the node N20, thereby configuring a current mirror circuit together with those transistors.

The node N21 is connected to a non-inverting input terminal of a differential amplifier 153. An inverting input terminal of the differential amplifier 153 is connected to the node N14. The differential amplifier 153 controls a voltage at the node N20 in such a way that a current VC at the node N21 becomes equal to a voltage VA at the node N14.

An operation of the bandgap reference circuit 27 shown in FIG. 11 will be explained in detail.

If a voltage applied to one diode 133 is VF1, and a voltage applied to the N number of parallel-connected diodes 137 is VF2, a following equation can be satisfied between the current I1 and the current I2 which flow through the current path CP1 and the current path CP2, respectively.

$$I1 = Is * \exp\left(\frac{VF1}{VT}\right) \quad \text{[Equation 1]}$$
$$I2 = N * Is * \exp\left(\frac{VF2}{VT}\right)$$

where Is is a reverse saturation current of the diode, VT=kT/q, and VF1, VF2 are respective forward voltages of the diodes 133, 137. I1 and I2 are set based on respective sizes of the pMOS transistors 131, 134, and if both have the same size, I1=I2 is satisfied. If respective resistances of the resistors 132, 135 are defined as R6, R7, a designing is made in such a way that R6*I1=R7*I2 is satisfied.

The differential amplifier 138 controls its output voltage in such a way that a potential at the node N13 becomes equal to a potential at the node N14, and controls respective magnitudes of the currents I1, I2. ΔVF (=VF1-VF2) which is a difference between the voltage VF1 and the voltage VF2 is applied to the resistor 136. The voltage ΔVF can be expressed as a following equation.

$$\Delta VF = VF1 - VF2 \quad \text{[Equation 2]}$$
$$= VT * \ln\left(N * \frac{I1}{I2}\right)$$
$$= VT * \ln\left(N * \frac{R7}{R6}\right)$$

If a designing is made in such a way that the current I3 which is a part of a current generating the output voltage Vbgr1 of the bandgap reference circuit 27 satisfies a relational expression I1=I3 (provided that the transistor 131 and the transistor 140 have the same size) then the current I3 can be expressed as a following equation.

$$I3 = I1 \quad \text{[Equation 3]}$$
$$= \frac{R7}{R6} * I2$$
$$= \frac{R7}{R6} * \frac{\Delta VF}{R1}$$
$$= \frac{1}{R1} * \frac{R7}{R6} * VT * \ln\left(N * \frac{R7}{R6}\right)$$

Regarding the current I4 which is a part of a current generating the output voltage Vbgr1, a designing is made in such a way that a relational expression I4=I5 is satisfied. A voltage VA at the node N14 can be expressed as a following equation.

$$VA = VF1 + R6 * I1 \quad \text{[Equation 4]}$$
$$= VF1 + \frac{R7}{R1} * VT * \ln\left(N * \frac{R7}{R6}\right)$$

If a voltage at the node N21 is VC, because VA=VC, the current I4 can be expressed as a following equation.

$$I4 = I5 \quad \text{[Equation 5]}$$
$$= \frac{VA}{RX}$$
$$= \frac{1}{RX} * VF1 + \frac{1}{RX} * \frac{R7}{R1} * VT * \ln\left(N * \frac{R7}{R6}\right)$$

The output voltage Vbgr1 is generated by the resistor 144 in which a sum of the current I3 and the current I4 flows, and can be expressed as a following equation.

$$Vbgr1 = R2a * (I3 + I4) \quad \text{[Equation 6]}$$
$$= \frac{R2a}{RX} * VF1 + \left(\frac{R2a}{R1} * \frac{R7}{R6} * \frac{R2a}{R1} * \frac{R7}{RX}\right) *$$
$$VT * \ln\left(N * \frac{R7}{R6}\right)$$

A condition that a temperature coefficient of the output voltage Vbgr1 becomes zero is;

$$\left(\begin{array}{c}\frac{R2a}{R1} * \frac{R7}{R6} + \\ \frac{R2a}{R1} * \frac{R7}{RX}\end{array}\right) * \frac{k}{q} * \ln\left(N * \frac{R7}{R6}\right) = -\frac{R2a}{RX} * \frac{dVF1}{dT} \quad \text{[Equation 7]}$$

and at this time, the output voltage Vbgr1 can be expressed as a following equation.

$$Vbgr1 = \frac{R2a}{RX} * \left(VF1 - \frac{dVF1}{dT} * T\right) \quad \text{[Equation 8]}$$

Figure 11:
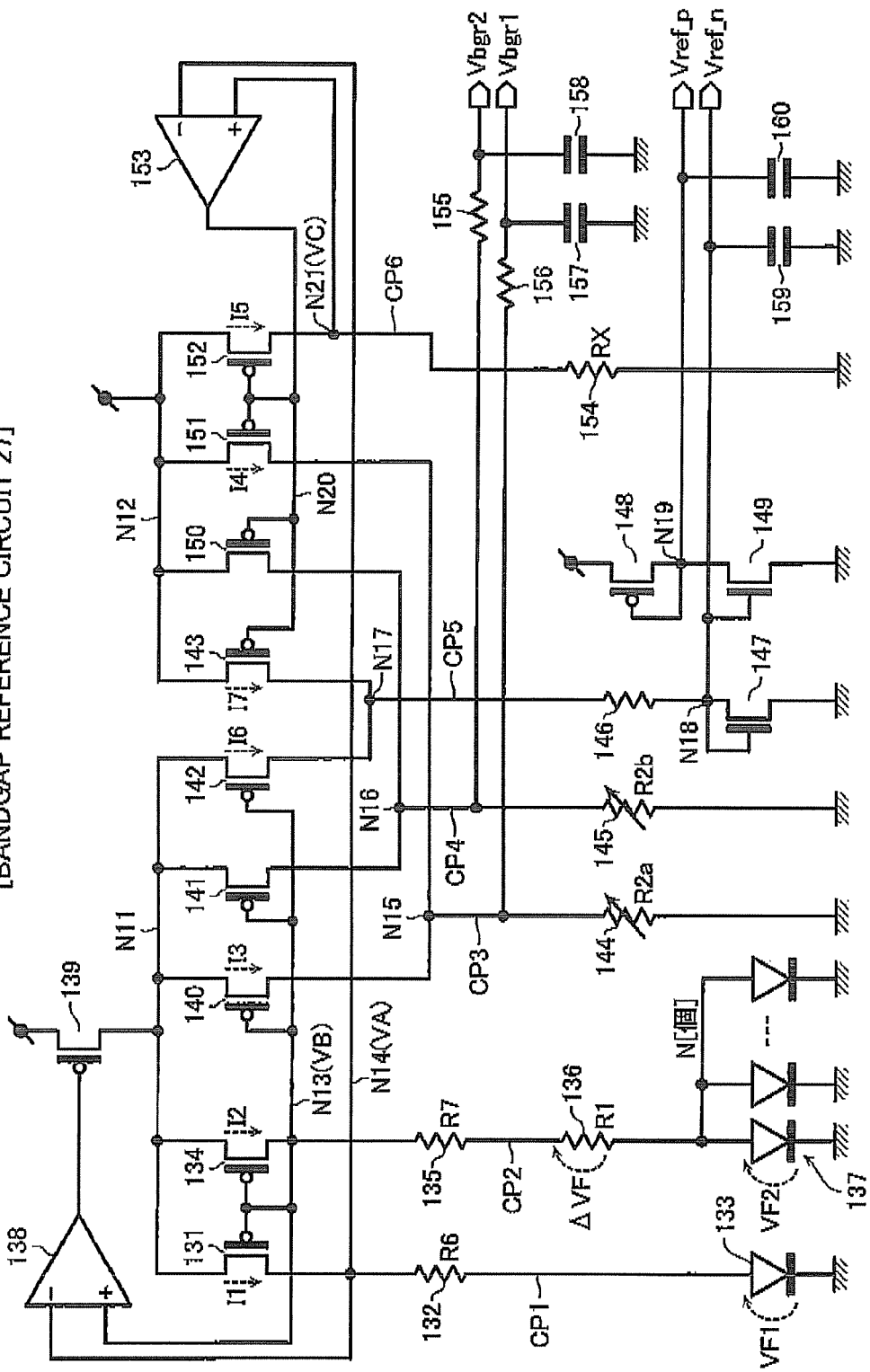
FIG. 11 is a circuit diagram showing a specific configuration of a bandgap reference circuit 27.
Figure 12:
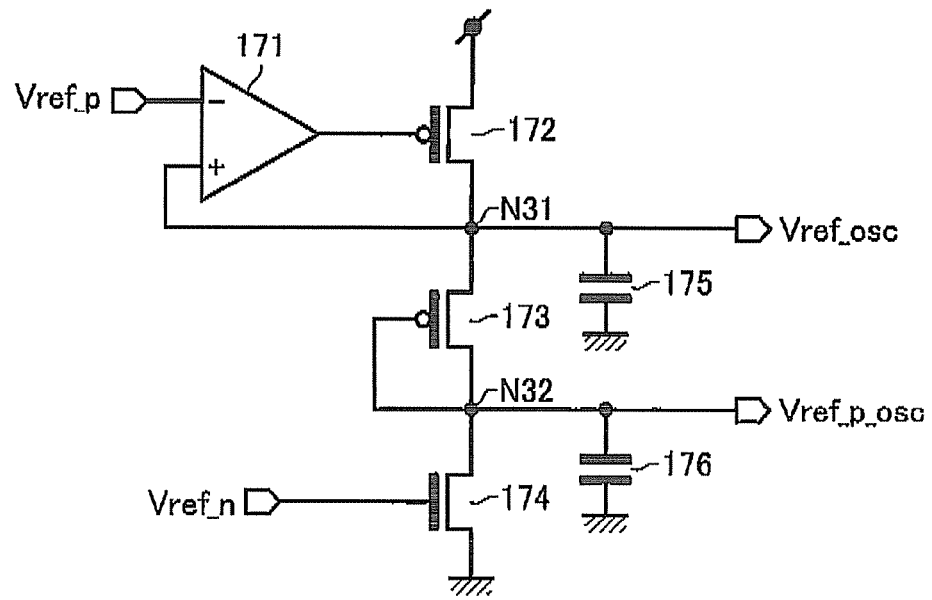
FIG. 12 is a circuit diagram showing a specific configuration of a voltage follower circuit 28.

As explained above, the output voltage Vbgr1 of the bandgap reference circuit 27 shown in FIG. 11 has no temperature dependence, and can be changed by controlling the resistance R2a of the variable resistor 144. When the output current by the driver IC 20 is changed from the deformation voltage Vact to the hold voltage Vhold, by changing the output voltage Vbgr1 to a lower voltage, loads applied to the transistors 26A and 26B can be reduced.

The bandgap reference circuit 27 outputs the output voltage Vbgr1 without a diode in the current path CP3 which is an output stage. Moreover, only one variable resistor 144 is used. Accordingly, it is possible to prevent the output voltage Vbgr1 from varying due to variability of a diode characteristic, variability of a matching characteristic of a resistor, and the like.

<Voltage Follower Circuit 28>

Next, an explanation will be given of a specific configuration of the voltage follower circuit 28. The voltage follower circuit 28 comprises a differential amplifier 171, pMOS transistors 172, 173, an nMOS transistor 174, and capacitors 175, 176.

The differential amplifier 171 has one input terminal into which the output voltage Vref_p is input, and has another input terminal connected to its output terminal (node N31). The node N31 is an output terminal for the output voltage Vref_osc. The transistors 172 to 174 are connected in series in this order between a power source terminal and a ground terminal.

A gate of the pMOS transistor 172 is connected to an output terminal of the differential amplifier 171. A gate (node N32) of the pMOS transistor 173 is short-circuited with a drain thereof, and this serves as an output terminal for the output voltage Vref_p_osc. The capacitors 175, 176 are connected between the node N31 and a ground terminal and between the node N32 and a ground terminal, respectively.

Accordingly, the voltage follower circuit 28 has a function of outputting the output voltages Vref_osc, Vref_p_osc with the output voltages Vref_p, Vref_n of the bandgap reference circuit 27 being as input voltages.

<Operation>

Next, with reference to FIGS. 13 and 14, an explanation will be given of an operation of the driver IC 20. The explanation will be given in particular of an operation when the output voltage is changed from the deformation voltage Vact to the hold voltage Vhold.

Figure 13:
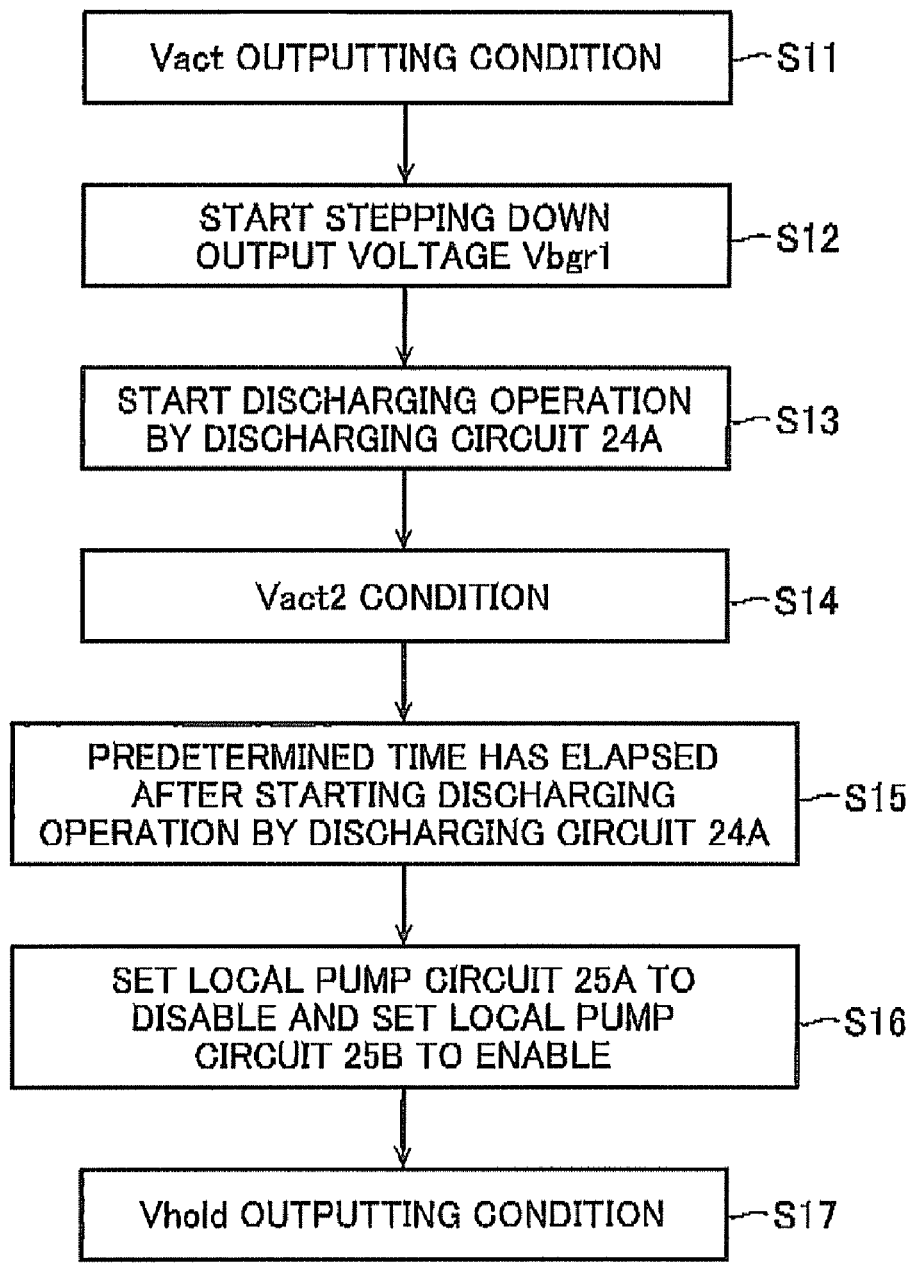
FIG. 13 is a flowchart showing an operation according to the first embodiment of the present invention.

To reduce the distance d between the main electrodes 14a, 15a of the MEMS-type variable capacitance capacitor 10, as the control signal ACT_En rises, the pump circuit 21A starts its operation, and a voltage at the output node ACTNODE is boosted to the deformation voltage Vact (step S11 in FIG. 13). The local pump circuit 25A outputs the gate voltage Vga which allows the nMOS transistor 26A to turn on, so that the deformation voltage Vact is supplied to the output terminal OUT.

At the same time, the pump circuit 21B, the oscillating circuit 22B, and the limiter circuit 23B also start operations, and the output node HOLDNODE is charged to the hold voltage Vhold. However, the local pump circuit 25B is not outputting the gate voltage Vgb, so that the nMOS transistor 26B is being in a non-conduction state.

Figure 14:
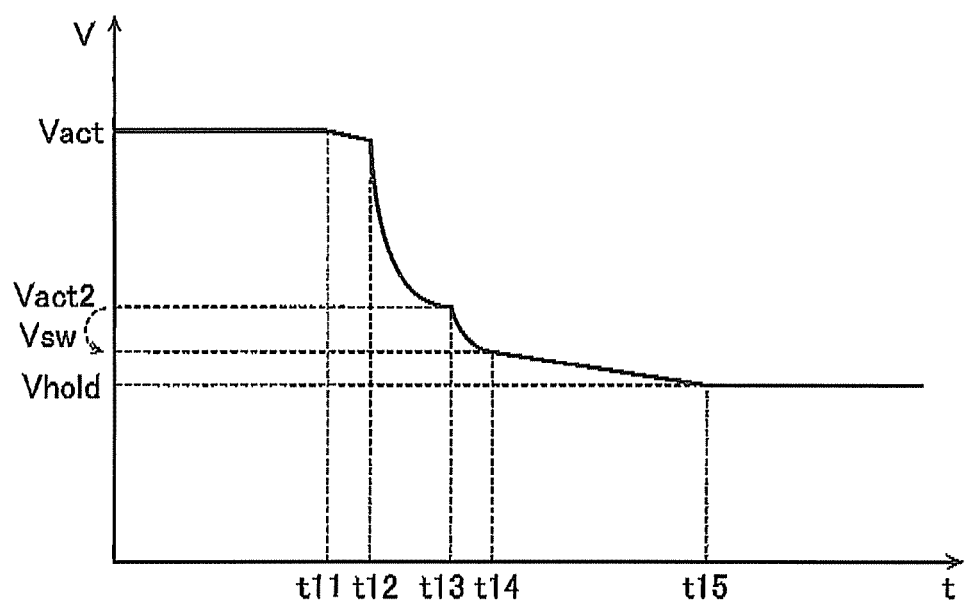
FIG. 14 is a graph showing an operation according to the first embodiment.

Thereafter, as the resistance R2a of the resistor 144 in the bandgap reference circuit 27 is changed to a smaller value, the output voltage Vbgr1 starts stepping down to Vvgr1' (step S12, at a time t11 in FIG. 14). Thereafter, the discharge circuit 24A starts its operation, and a voltage at the output node ACTNODE starts decreasing to a voltage Vact2 (step S13, at a time t12).

In this fashion, the voltage at the output node ACTNODE decreases to the voltage Vact2 expressed by a following equation (step S14, at a time t13), and if a predetermined time elapses from when the discharge circuit 24A starts its operation (step S15), the discharge circuit 24A outputs the control signal DC_Ena="L", thereby terminating (disabling) the operation of the local pump circuit 25A, resulting in discharging of the voltage at the output terminal OUTLPa.

At the same time, the operation of the local pump circuit 25b is started (enabled). Accordingly, the nMOS transistor 26A becomes in a non-conduction state, while the nMOS transistor 26B turns ON.

$$Vact2 = \left(1 + \frac{Ru}{Rd}\right) * Vbgr1' \quad \text{[Equation 9]}$$

Note that a speed that the voltage at the output node ACTNODE changes from Vact to Vact2 varies depending on the capacitance Cload of the capacitor C2 and a value of a bias current flowing through the resistor 53 in the limiter circuit 23A. If the capacitance Cload is large and the value of the bias current in the limiter circuit 23A is small, the speed of change in the voltage at the output node ACTNODE becomes slow. Conversely, if the capacitance Cload is small and the value of the bias current in the limiter circuit 23A is large, the speed of change in the voltage at the output node ACTNODE becomes fast. There may be a case in which the occurrence order of the step S14 and the step S15 are reversed.

The nMOS transistor 26A becomes in a non-conduction state in this fashion, and at this time, a voltage Vsw which can be expressed as a following equation is applied between the source of the nMOS transistor 26A and the drain thereof.

$$Vsw = Vact2 - \frac{Cload * Vact2 + Chold * Vhold}{Cload + Chold} \quad \text{[Equation 10]}$$
$$= \frac{Chold * (Vact2 - Vhold)}{Cload + Chold}$$

In the embodiment, however, because the operation of discharging the output node ACTNODE is started before the nMOS transistor 26A becomes in a non-conduction state, the voltage Vsw can be set small. Accordingly, it is possible to avoid a problem that the reliability is deteriorated due to the characteristic degradation (a change in the threshold voltage) originating from the channel hot electron of the nMOS transistor 26A.

Note that the voltage Vact2 can be changed arbitrary by the bandgap reference circuit 27.

Second Embodiment

Next, an explanation will be given of a semiconductor integrated circuit according to the second embodiment of the present invention with reference to the accompanying drawings. The semiconductor integrated circuit of the second embodiment has the same entire configuration as that of FIG. 1, and the configuration of the driver IC 20 is the same as that of FIG. 3. Further, individual circuits configuring the driver IC 20 have the same configurations as those of FIGS. 4 to 12.

In the second embodiment, the configuration of the bandgap reference circuit 27 differs from that of the first embodiment. However, the difference is that only setting is made in such a way that the magnitude of the current I6 and that of the current I7 can be expressed by following equations, so that the explanation will be given with reference to FIG. 11.

$$I6 = I1$$

$$I7 = m*I5 \quad \text{[Equation 11]}$$

A current Iref which is a sum of the current I6 and the current I7 flows through the resistor 146. It is required that the current Iref hardly depends on a power supply voltage, a temperature, and a variability in order to stabilize the oscillating frequency at the oscillating circuit 22A.

The current I1 and the current I5 can be expressed as following equations.

$$I1 = \frac{1}{R1} * \frac{R7}{R6} * VT * \ln\left(N * \frac{R7}{R6}\right) \quad \text{[Equation 12]}$$

$$I5 = \frac{1}{RX} * VF1 + \frac{1}{RX} * \frac{R7}{R1} * VT * \ln\left(N * \frac{R7}{R6}\right)$$

Thus, the current Iref can be expressed as a following equation.

$$Iref = I6 + I7 \quad \text{[Equation 13]}$$

$$= I1 + m*I5$$

$$= \frac{m}{RX} * VF1 + \left(\frac{1}{R1} * \frac{R7}{R6} + \frac{m}{R1} * \frac{R7}{RX}\right) *$$

$$VT * \ln\left(N * \frac{R7}{R6}\right)$$

In order to set the temperature dependence of the current Iref to zero, it is necessary to satisfy the following condition.

$$\frac{d\left(\begin{array}{c}\frac{m}{RX}*VF1+\\ \left(\frac{1}{R1}*\frac{R7}{R6}+\\ \frac{m}{R1}*\frac{R7}{RX}\right)*\\ VT*\ln\left(N*\frac{R7}{R6}\right)\end{array}\right)}{dT} = m*\left(\frac{d\left(\frac{1}{RX}\right)}{dT}*VF1+\frac{1}{RX}*\frac{dVF1}{dT}\right) + \quad \text{[Equation 14]}$$

$$\frac{d\left(\frac{1}{R1}*\frac{R7}{R6}+\frac{m}{R1}*\frac{R7}{RX}\right)}{dT}*VT*\ln\left(N*\frac{R7}{R6}\right) +$$

$$\left(\frac{1}{R1}*\frac{R7}{R6}+\frac{m}{R1}*\frac{R7}{RX}\right)*\frac{k}{q}*\ln\left(N*\frac{R7}{R6}\right)$$

$$= 0$$

Parameters of individual circuit elements are set in such away that such condition is satisfied or a value of m substantially satisfies such condition. It is assumed that resistors have a positive temperature coefficient. The higher a temperature rises, the smaller the current I5 becomes. This is because the resistance of the resistor 154 increases. In contrast, the higher a temperature rises, the larger the current I1 becomes. This is because the resistance of the resistor 132 increases, but much more than that, the diode 133 facilitates the current to flow. Therefore, the current Iref, which is generated with the value m set for the current I1 and the current I5 in accordance with a temperature coefficient of each resistor and that of the diode, can be a reference current which is not likely to depend on a temperature.

Although the embodiments of the present invention have been explained above, the present invention is not limited to the foregoing embodiments, and can be changed and modified in various forms without departing from the scope of the present invention.

What is claimed is:

1. A semiconductor integrated circuit comprising:
   a first booster circuit configured to boost a power supply voltage to a first voltage;
   a second booster circuit configured to boost a power supply voltage to a second voltage;
   a first transistor having one end connected to a first node where the first voltage is output, the first transistor being configured to transfer the first voltage to an output terminal;
   a second transistor having one end connected to a second node where the second voltage is output, the second transistor being configured to transfer the second voltage to the output terminal;
   a third booster circuit configured to supply a third voltage obtained by further boosting the first voltage to a control terminal of the first transistor to turn on the first transistor;
   a fourth booster circuit configured to supply a fourth voltage obtained by further boosting the second voltage to a control terminal of the second transistor to turn on the second transistor;
   a first discharging circuit configured to discharge a voltage at the first node to a predetermined voltage; and
   a second discharging circuit configured to discharge a voltage at the output terminal to a predetermined voltage, and
   the third booster circuit being further configured to lower a voltage supplied to the control terminal of the first transistor to turn off the first transistor at a time after discharging of the first node is started, and
   the fourth booster circuit being further configured to increase, in accordance with a signal from the third booster circuit, a voltage supplied to the control terminal of the second transistor to turn on the second transistor after the first transistor is turned off.

2. The semiconductor integrated circuit according to claim 1, further comprising:
   a limiter circuit configured to output a limiter signal based on a comparison result between a voltage corresponding to a voltage at the first node and a reference voltage, the limiter signal being for terminating an operation of the first booster circuit; and
   a reference voltage generating circuit configured to generate the reference voltage, and wherein
   the reference voltage generating circuit comprises:
      a current generating circuit configured to generate a current which does not depend on a power supply voltage; and
      a variable resistor configured to allow the current to flow therethrough;
   and the reference voltage generating circuit is configured to change the reference voltage by changing a resistance of the variable resistor.

3. The semiconductor integrated circuit according to claim 1, further comprising a first capacitor provided between the second node and a ground potential.

4. The semiconductor integrated circuit according to claim 1, further comprising a second capacitor provided between the output terminal and a ground potential.

5. The semiconductor integrated circuit according to claim 1, further comprising:
   a first oscillating circuit configured to provide a first clock pulse to the first booster circuit; and
   a second oscillating circuit configured to provide a second clock pulse to the second booster circuit, and wherein
   the first booster circuit boosts the power supply voltage based on the first clock pulse,
   the second booster circuit boosts the power supply voltage based on the second clock pulse, and
   a frequency of the second clock pulse is smaller than a frequency of the first clock pulse.

6. The semiconductor integrated circuit according to claim 5, further comprising a voltage follower circuit configured to provide a second signal to the second oscillating circuit based on a first signal output from the reference voltage generating circuit, and wherein
   the second oscillating circuit generates the second clock pulse based on the second signal.

7. The semiconductor integrated circuit according to claim 5, wherein the first oscillating circuit and the second oscillating circuit each comprises a ring oscillator having plural CMOS inverters connected in a ring manner.

8. A semiconductor integrated circuit comprising:
   a first booster circuit configured to boost a power supply voltage to a first voltage;
   a second booster circuit configured to boost a power supply voltage to a second voltage;
   a first transistor having one end connected to a first node where the first voltage is output, the first transistor being configured to transfer the first voltage to an output terminal;
   a second transistor having one end connected to a second node where the second voltage is output, the second transistor being configured to transfer the second voltage to the output terminal;
   a third booster circuit configured to supply a third voltage obtained by further boosting the first voltage to a control terminal of the first transistor to turn on the first transistor;
   a fourth booster circuit configured to supply a fourth voltage obtained by further boosting the second voltage to a control terminal of the second transistor to turn on the second transistor;
   a first discharging circuit configured to discharge a voltage at the first node to a predetermined voltage;
   a second discharging circuit configured to discharge a voltage at the output terminal to a predetermined voltage;
   a limiter circuit configured to output a limiter signal based on a comparison result between a voltage corresponding to a voltage at the first node and a reference voltage, the limiter signal being for terminating an operation of the first booster circuit; and
   a reference voltage generating circuit configured to generate the reference voltage, and
   the reference voltage generating circuit comprising:
      a first current path including a first pMOS transistor, a first resistor, and a first diode connected in series in this order between a third node and a ground potential;
      a second current path including a second pMOS transistor, a second resistor, a third resistor, and N number of parallel-connected diodes connected in series in this order between the third node and a ground potential;
      a third current path including a third pMOS transistor and a first variable resistor connected in series between the third node and a ground potential;
      a fourth pMOS transistor connected between the third node and a power supply voltage source; and
      a first differential amplifier having a first input terminal connected to respective gates of the first, second, and third pMOS transistors, and a second input terminal connected to a connection between the first pMOS transistor and the first resistor, the first differential amplifier being configured to output a differential signal to a gate of the fourth pMOS transistor, and
      the first variable resistor being configured to have a resistance changed from a first value to a second value lower than the first value at a time after a voltage at the first node reaches the first voltage.

9. The semiconductor integrated circuit according to claim 8, further comprising a first capacitor provided between the second node and a ground potential.

10. The semiconductor integrated circuit according to claim 8, further comprising a second capacitor provided between the output terminal and a ground potential.

11. The semiconductor integrated circuit according to claim 8, further comprising:
   a first oscillating circuit configured to provide a first clock pulse to the first booster circuit; and
   a second oscillating circuit configured to provide a second clock pulse to the second booster circuit, and wherein
   the first booster circuit boosts the power supply voltage based on the first clock pulse,
   the second booster circuit boosts the power supply voltage based on the second clock pulse, and
   a frequency of the second clock pulse is smaller than a frequency of the first clock pulse.

12. The semiconductor integrated circuit according to claim 11, further comprising a voltage follower circuit configured to provide a second signal to the second oscillating circuit based on a first signal output from the reference voltage generating circuit, and wherein
   the second oscillating circuit generates the second clock pulse based on the second signal.

13. The semiconductor integrated circuit according to claim 11, wherein the first oscillating circuit and the second oscillating circuit each comprises a ring oscillator having plural CMOS inverters connected in a ring manner.

14. A semiconductor integrated circuit comprising:
   a first booster circuit configured to boost a power supply voltage to a first voltage;
   a second booster circuit configured to boost a power supply voltage to a second voltage;
   a first transistor having one end connected to a first node where the first voltage is output, the first transistor being configured to transfer the first voltage to an output terminal;
   a second transistor having one end connected to a second node where the second voltage is output, the second transistor being configured to transfer the second voltage to the output terminal;
   a third booster circuit configured to supply a third voltage obtained by further boosting the first voltage to a control terminal of the first transistor to turn on the first transistor;

a fourth booster circuit configured to supply a fourth voltage obtained by further boosting the second voltage to a control terminal of the second transistor to turn on the second transistor;

a first discharging circuit configured to discharge a voltage at the first node to a predetermined voltage;

a second discharging circuit configured to discharge a voltage at the output terminal to a predetermined voltage;

a limiter circuit configured to output a limiter signal based on a comparison result between a voltage corresponding to a voltage at the first node and a reference voltage, the limiter signal being for terminating an operation of the first booster circuit; and a reference voltage generating circuit configured to generate the reference voltage, and the reference voltage generating circuit comprising:

a first current path including a first pMOS transistor, a first resistor, and a first diode connected in series in this order between a third node and a ground potential;

a second current path including a second pMOS transistor, a second resistor, a third resistor, and N number of parallel-connected diodes connected in series in this order between the third node and a ground potential;

a third current path including a third pMOS transistor and a first variable resistor connected in series between the third node and a ground potential, and by a fourth pMOS transistor connected between a fourth node and a drain of the third pMOS transistor;

a fourth current path including a fifth pMOS transistor and a second variable resistor connected in series between the third node and a ground potential, as well as a sixth pMOS transistor connected between the fourth node and a drain of the fifth pMOS transistor;

a fifth current path including a seventh pMOS transistor connected between the third node and a fifth node, by an eighth pMOS transistor connected between the fourth node and the fifth node, and by a first nMOS transistor connected with the fourth resistor in a diode connection manner between the fifth node and a ground potential, the seventh pMOS transistor, the eighth pMOS transistor, and the first nMOS transistor being connected in this order;

a sixth current path including a ninth pMOS transistor and a fifth resistor connected in series in this order between the fourth node and a ground potential;

a tenth pMOS transistor connected between the third node and a power supply voltage source;

a first differential amplifier having a first input terminal connected to respective gates of the first, second, third, fifth, and seventh pMOS transistors, and a second input terminal connected to a sixth node which is a connection between the first pMOS transistor and the first resistor, the first differential amplifier being configured to output a differential signal to a gate of the tenth pMOS transistor; and a second differential amplifier having a first input terminal connected to the sixth node, and a second input terminal connected to a seventh node which is a connection between the ninth pMOS transistor and the fifth resistor, the second differential amplifier being configured to output a differential signal to respective gates of the fourth, fifth, eighth, and ninth pMOS transistors, and the first variable resistor being configured to have a resistance changed from a first value to a second value lower than the first value at a time after a voltage at the first node reaches the first voltage.

15. The semiconductor integrated circuit according to claim 14, wherein a current ratio between a current which flows through the seventh pMOS transistor and a current which flows through the eighth pMOS transistor is so set as to make a temperature dependence of the reference voltage substantially zero.

16. The semiconductor integrated circuit according to claim 14, further comprising a first capacitor provided between the second node and a ground potential.

17. The semiconductor integrated circuit according to claim 14, further comprising a second capacitor provided between the output terminal and a ground potential.

18. The semiconductor integrated circuit according to claim 14, further comprising:

a first oscillating circuit configured to provide a first clock pulse to the first booster circuit; and a second oscillating circuit configured to provide a second clock pulse to the second booster circuit, and wherein the first booster circuit boosts the power supply voltage based on the first clock pulse, the second booster circuit boosts the power supply voltage based on the second clock pulse, and a frequency of the second clock pulse is smaller than a frequency of the first clock pulse.

19. The semiconductor integrated circuit according to claim 18, further comprising a voltage follower circuit configured to provide a second signal to the second oscillating circuit based on a first signal output from the reference voltage generating circuit, and wherein the second oscillating circuit generates the second clock pulse based on the second signal.

20. The semiconductor integrated circuit according to claim 18, wherein the first oscillating circuit and the second oscillating circuit each comprises a ring oscillator having plural CMOS inverters connected in a ring manner.

* * * * *